(12) United States Patent
Uchida et al.

(10) Patent No.: US 6,670,030 B1
(45) Date of Patent: Dec. 30, 2003

(54) BIAXIALLY ORIENTED LAMINATE POLYESTER FILM FOR MAGNETIC RECORDING MEDIUM

(75) Inventors: Toshikazu Uchida, Sagamihara (JP); Mitsuo Tojo, Sagamihara (JP); Toshifumi Osawa, Sagamihara (JP); Akira Kameoka, Matsuyama (JP); Tomokatsu Ura, Matsuyama (JP); Masahiko Kosuge, Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/582,820

(22) PCT Filed: Nov. 1, 1999

(86) PCT No.: PCT/JP99/09080

§ 371 (c)(1), (2), (4) Date: Jul. 3, 2000

(87) PCT Pub. No.: WO00/26903

PCT Pub. Date: May 11, 2000

(30) Foreign Application Priority Data

| Nov. 2, 1998 | (JP) | 10-311963 |
| Nov. 2, 1998 | (JP) | 10-311964 |
| Feb. 23, 1999 | (JP) | 11-44183 |
| Feb. 23, 1999 | (JP) | 11-44184 |

(51) Int. Cl.[7] .................. B32B 5/16; B32B 27/36; B32B 9/00; B32B 3/00; G11B 5/66
(52) U.S. Cl. .................. 428/323; 428/220; 428/339; 428/332; 428/480; 428/692; 428/694 BR; 428/694 ST; 428/694 SL; 428/694 SG; 428/900; 428/923; 428/924; 428/926
(58) Field of Search .................. 428/64.2, 653, 428/65.6, 213, 215, 220, 323, 328–332, 339, 411.1, 480, 688, 689, 692, 693, 900, 923–926, 928, 694 BR, 694 ST, 694 SL, 694 SG

(56) References Cited

FOREIGN PATENT DOCUMENTS

| EP | 524 840 | 1/1993 |
| EP | 822220 A2 | 2/1998 |
| EP | 822220 | 2/1998 |
| JP | 47-15703 | 5/1972 |
| JP | 47-16193 | 5/1972 |
| JP | 47-42756 | 10/1972 |
| JP | 48-31293 | 4/1973 |
| JP | 52-33996 | 3/1977 |
| JP | 5-298670 | 11/1993 |
| JP | 6-340734 | 12/1994 |
| JP | 7-48439 | 2/1995 |
| JP | 8-188704 | 7/1996 |
| JP | 5-194772 | 8/1998 |

OTHER PUBLICATIONS

International Search Report.

*Primary Examiner*—Paul Thibodeau
*Assistant Examiner*—Sheeba Ahmed
(74) *Attorney, Agent, or Firm*—Sughrue Mion, PLLC

(57) ABSTRACT

A biaxially oriented laminate polyester film for magnetic recording medium, which is a laminate film comprising a base layer (A) formed of a polyester resin and a coating layer (B) which exists on one surface of the base layer (A) and contains a binder resin, added fine particles and a surfactant, wherein the base layer (A) is a biaxially oriented film which substantially contains no fine particles added or contains 0.001 to 0.1% by weight of added fine particles having an average particle diameter of 0.005 to 0.3 μm, the coating layer (B) has a surface having a central plane roughness (SRa) of 5 nm or less, the surface of the coating layer (B) has protrusions having a major diameter of 0.05 μm or more in a density of 80,000 pieces/mm$^2$ or less and has extra-large protrusions having a major diameter of 10 μm or more in a density of 20 pieces/cm$^2$ or less. Further, a thin film layer (C) may be further laminated on a surface on the side of the base layer (A) of the laminate polyester film which side is not in contact with the coating layer (B).

According to the present invention, there is provided a biaxially oriented laminate polyester film useful as a base film for a magnetic recording medium which has excellent running durability and electromagnetic conversion characteristics and is almost free from drop-out.

28 Claims, No Drawings

BIAXIALLY ORIENTED LAMINATE POLYESTER FILM FOR MAGNETIC RECORDING MEDIUM

TECHNICAL FIELD OF THE INVENTION

The present invention relates to a biaxially oriented laminate polyester film for a magnetic recording medium. More specifically, it relates to a biaxially oriented laminate polyester film useful as a base film for a magnetic recording medium which is excellent in running durability and electromagnetic conversion characteristics and is almost free from drop-out. Further, the invention relates to a biaxially oriented laminate polyester film excellent in durability against deterioration under dry heat and controllability of precipitation of foreign matters.

PRIOR ART

In recent years, progress has been remarkably made toward higher-density magnetic recording media, as exemplified by the development and practical use of a thin metal film magnetic recording medium having a thin ferromagnetic metal film formed on a non-magnetic base film by a physical deposition method such as vacuum deposition, sputtering or the like or a plating method, and a thin layer coated magnetic recording medium having a layer having a thickness of 2 $\mu$m or less, the layer being formed from a needle-like magnetic powder such as a metal powder or an iron oxide powder.

As examples of the thin metal film magnetic recording medium, JP-A 54-147010 discloses a magnetic recording medium having a first thin Co-film magnetic layer coated on a non-magnetic base film and a second thin Co-film magnetic layer which has a larger thickness than the first thin Co-film magnetic layer and is formed on the first thin Co-film magnetic layer via a non-magnetic material layer. Further, JP-A 52-134706 discloses a vertical magnetic recording medium formed from a Co—Cr alloy.

As an example of the thin layer coated magnetic recording medium, "Technical Report MR 94-78" issued by the Institute of Electronics and Communication Engineers of Japan (1995–02) discloses a high-density magnetic recording on the basis of an extremely thin layer coated magnetic recording medium.

The conventional coated magnetic recording media (magnetic recording media produced by incorporating a magnetic powder in an organic polymer binder and coating the mixture on a non-magnetic base film) has a low recording density and uses a long recording wavelength, so that the thickness of their magnetic layer is as thick as about 2 $\mu$m or more. In contrast, a thin ferromagnetic metal film formed by thin film-forming means such as vapor deposition, sputtering or ion plating has a remarkably small thickness of as small as 0.2 $\mu$m or less. Further, concerning the extremely thin-layer coated media, some media having a thickness of 0.13 $\mu$m are provided and hence, have a very small thickness, although they have a non-magnetic underlying layer.

In the above high-density magnetic recording media, therefore, the surface condition of the non-magnetic base film has a great influence on the surface characteristics of the magnetic layer. In the thin metal film magnetic recording medium in particular, the surface condition of the non-magnetic base film develops directly into an unevenness of surface of a magnetic layer (magnetic recording layer).

Further, the thin metal film magnetic recording medium involves the running property of the surface of a thin metal film as one of serious problems in actual use. In the coated magnetic recording medium having a base film coated with a mixture of a magnetic powder incorporated in an organic polymer binder, the running property of the magnetic layer surface can be improved by dispersing a lubricant in the binder.

In the thin metal film magnetic recording medium, however, such measure cannot be taken, and it is very difficult to maintain the stable running property. Particularly, it has a problem that its running property is inferior under high-temperature and high-humidity conditions. Further, in this case, there is another drawback that a reduction in the output during its repeated use is larger than that of a coated magnetic recording medium.

On the other hand, from the viewpoint of the formation of a non-magnetic base film and handling properties such as transportation, winding-up and unwinding in processing steps, an extreme smoothness of the film surface causes slipperiness between films to be poor and causes a blocking phenomenon to take place, so that the roll formation thereof is deteriorated and that the yield of products decreases. As a consequence, the production cost thereof increases. In view of a production cost, therefore, the surface of the non-magnetic base film is as rough as possible.

As described above, the surface of the non-magnetic base film is required to be smooth from the viewpoint of electromagnetic conversion characteristics, whereas it is required to be rough from the viewpoint of handling properties and film costs.

For the production of a high-density magnetic recording medium of excellent qualities, it is required to satisfy the above two contradictory requirements at the same time.

JP-A 5-194772 discloses a polyester film for a magnetic recording medium, the polyester film having one surface coated with a primer layer of a continuous thin film for a magnetic layer, wherein the continuous thin film surface of the primer layer has (A) small protrusions which have a height of 13 nm or less and comprise particles having an average particle diameter of less than 0.06 $\mu$m as cores, (B) large protrusions which have a height of 30 nm or less and comprise particles having an average particle diameter of 0.06 $\mu$m or more as cores, and (C) fine protrusions formed solely of a resin forming the primer layer, the numbers of these protrusions satisfying the following expressions:

$$AN \geq 1.0 \times 10^6 \text{ (pieces/mm}^2\text{)}$$

$$BN \geq 1.05 \times 10^4 \text{ (pieces/mm}^2\text{)}$$

$$AN \leq -3.4 \times 10^2 \times BN + 13.6 \times 10^6 \text{ (pieces/mm}^2\text{)}$$

$$CN \leq 4.0 \times 10^6 \text{ (pieces/mm}^2\text{)}$$

in which AN is the number (pieces/mm$^2$) of the small protrusions, BN is the number (pieces/mm$^2$) of the large protrusions and CN is the number (pieces/mm$^2$) of the fine protrusions, the continuous thin film formed solely of a resin forming the primer layer has a fine surface roughness, RaS, of 1.10 nm or less, and the continuous thin film has a surface roughness, Ra, of 1 to 10 nm.

JP-A 5-298670 discloses a polyester film for magnetic recording medium, the polyester film having one surface coated with a primer layer of a continuous thin film for a magnetic layer, wherein the continuous thin film surface of the primer layer has (A) small protrusions which have a height of 13 nm or less and comprise particles having an average particle diameter of less than 0.06 μm as cores, (B) large protrusions which have a height of 30 nm or less and comprise particles having an average particle diameter of 0.06 μm or more as cores, and (C) fine protrusions formed solely of a resin forming the primer layer and having the longest major diameter of 0.30 μm or less, the numbers of these protrusions satisfying the following expressions:

$$AN \geq 1.0 \times 10^6 \text{ (pieces/mm}^2)$$

$$BN \geq 1.05 \times 10^4 \text{ (pieces/mm}^2)$$

$$AN \leq -3.4 \times 10^2 \times BN + 13.6 \times 10^6 \text{ (pieces/mm}^2)$$

$$1.0 \times 10 \text{ (pieces/mm}^2) \leq CN \leq 1.0 \times 10^4 \text{ (pieces/mm}^2)$$

in which AN is the number (pieces/mm$^2$)of the small protrusions, BN is the number (pieces/mm$^2$) of the large protrusions and CN is the number (pieces/mm$^2$) of the fine protrusions,
the continuous thin film formed solely of a resin forming the primer layer has a fine surface roughness, RaS, of 1.10 nm or less, the continuous thin film has a surface roughness, Ra, of 1 to 10 nm, and when the polyester film is continuously heated in air at 160° C. for 5 minutes, the continuous thin film can be controlled to show that the rate of deposition of polyester oligomer fine crystals on the film surface is 0.8% or less.

The above polyester film can attain a smoother base film on the magnetic layer surface side to some extent. However, particles contained in the base film on the magnetic layer surface side for improving the running durability perform insufficient dispersion, so that extra-large protrusions increase in number, and there is therefore a problem that drop-out is caused or that a magnetic head is caused to suffer an partial abrasion to invite a reduction of output.

In the high-density magnetic recording medium, the surface condition of the non-magnetic base film exerts a great influence on the surface characteristics of a magnetic layer as described already, and studies are therefore under way on measures to control coarse protrusions on the surface of the base film, from the standpoint of polyester production as well.

One of the causes of formation of protrusions on the film surface is that a catalyst added during the production of the polyester, an antimony compound in particular, precipitates in the polyester. For example, the antimony compound accomplishes a high polymerization rate and has advantages that an obtained polyester is excellent in various properties such as heat stability, terminal carboxyl group amount, softening point, and the like. However, it has a drawback that it produces a precipitate in the polyester as described above.

As catalysts for polymerization of a polyester, in addition to the above antimony compound, JP-B 47-15703, JP-B 47-16193, JP-B 47-42756, etc. disclose a germanium compound, and JP-A 48-31293 and JP-A 52-33996 disclose use of a titanium compound. When a germanium compound is used, no precipitate is formed unlike the use of an antimony compound. Since, however, the germanium compound causes a large side reaction during the polymerization, an obtained polyester has a low softening point, and when it is made into a film, the film comes to have a low mechanical strength. When a titanium compound is used, the polymerization rate is very high, and no precipitate is formed unlike the use of an antimony compound. However, it involves a problem that an obtained polyester is poor in heat stability.

Meanwhile, it is general practice to improve a polyester in heat stability by adding a phosphorus compound in the production of the polyester. However, the phosphorus compound reacts with most polymerization catalysts to decrease the catalyst activity or to cause a precipitate. Particularly, the titanium compound is deactivated to a considerable degree in the presence of a phosphorus compound.

Further, in the production of a base film for a deposited video film, it is difficult to secure running properties and wind-up properties of the film since the surface of the film is required to have an ultra-flatness. Under the circumstances, it is general practice to smoothen the film surface (e.g., formation of a smooth layer). For this purpose, it is required in many cases to set a heat-setting temperature during the film formation at a little higher temperature (230 to 240° C.) than an ordinary heat-setting temperature (205 to 220° C.). However, it has been found that, when a film undergoes stopping of running inside a heat-setting machine (stenter) due to breakage of the film, etc., a thin polyester film comes to be treated under dry heat at a high temperature, so that the film deteriorates in a surprisingly short period of time to become fine powder and adhere to the inside surface of the stenter, thereby causing a trouble that the powder constitutes foreign matters during the subsequent film formation. The above trouble is not caused when an antimony compound is used as a catalyst, but it is caused when a titanium compound or a germanium compound is used. The above trouble is strikingly caused when a titanium compound in particular is used.

Concerning the production of a polyester, JP-A 6-340734 discloses that a polyester having an excellent surface flatness as a film can be produced by using a calcium compound, a magnesium compound, a phosphorus compound and an antimony compound as a catalyst and a stabilizer and bringing their contents and amount ratio into specific ranges.

Further, JP-A 7-48439 discloses that a polyester having, as a film, excellent durability against deterioration under dry heat and excellent surface flatness can be produced by using a calcium compound, a magnesium compound, a phosphorus compound and a titanium compound as a catalyst and a stabilizer and bringing their contents and amount ratio into specific ranges.

Further, JP-A 8-188704 discloses that a polyester having, as a film, excellent durability against deterioration under dry heat and excellent controllability against precipitation of antimony can be produced by using a titanium compound, a germanium compound, an antimony compound and a phosphorus compound as a catalyst and a stabilizer and bringing their contents and amount ratio into specific ranges.

When one of the above processes for the production of a polyester is used and, further, when an obtained polyester is used, for producing a polyester film having a primer layer coated thereon, the formation of a smoother base film on the magnetic surface side can be accomplished to some extent. In recent years, however, it is demanded to achieve a higher order of the recording density, and there is caused a problem that film-surface protrusions which have not so far caused a problem cause drop-out, and the like.

Problems that the Invention Intends to Solve

It is a first object of the present invention to provide a biaxially oriented laminate polyester film useful as a base film for a high-density magnetic recording medium that is excellent in running durability and electromagnetic conversion characteristics and causes extremely fewer drop-outs.

It is a second object of the present invention to provide a biaxially oriented polyester film useful as a base film for a high-density magnetic recording medium, which film is excellent in durability against deterioration under dry heat and controllability against the precipitation of foreign matters.

Means to Solve the Problems

According to studies made by the present inventors, it has been found that the above objects of the present invention are achieved by a biaxially oriented laminate polyester film for magnetic recording medium, which is a laminate film comprising a base layer (A) formed of a polyester resin and a coating layer (B) formed on one surface of the base layer (A), the base layer (A) and the coating layer (B) fulfilling the following requirements (1) to (3):

(1) the base layer (A) substantially contains no fine particles added or contains 0.001 to 0.1% by weight of added fine particles having an average particle diameter of 0.005 to 0.3 μm, (2) the coating layer (B) contains a binder resin, added fine particles and a surfactant, the added fine particles having an average particle diameter of 10 to 50 nm and being contained in an amount of 0.5 to 30% by weight, and the coating layer (B) having a thickness of 3 to 40 nm, and (3) the coating layer (B) has a surface which satisfies the following surface characteristics (a) to (d):

(a) the surface has 80,000 pieces/mm$^2$ or less of protrusions having a major diameter of 0.05 μm or more when measured on the basis of a surface photograph taken and enlarged at a magnification of 5,000 with a scanning electron microscope, (b) the surface has 1 to 40 pieces/μm$^2$ of protrusions, measured on the basis of a surface photograph taken and enlarged at a magnification of 35,000 with a scanning electron microscope, (c) the surface has 20 pieces/cm$^2$ or less of extra-large protrusions having a major diameter of 10 μm or more, and (d) the surface has a central plane average roughness (SRa) of 5 nm or less.

The biaxially oriented laminate polyester film of the present invention will be explained further in details.

In the laminate polyester film of the present invention, the polyester resin for forming the base layer (A) refers to an aromatic polyester resin generally known as a base film. Specifically, it is a linear polyester comprising terephthalic acid or naphthalenedicarboxylic acid as a main acid component and ethylene glycol as a main glycol component and having film formability. The above polyester may be any one of a homopolyester and a copolyester. As a polyester, particularly preferred is a polyester which comprises at least 80 mol %, preferably at least 90 mol %, based on the total of recurring units, of an ethylene terephthalate unit or an ethylene-2,6-naphthalate unit.

In the copolyester, the comonomer includes other diol components such as diethylene glycol, propylene glycol, tetramethylene glycol, hexamethylene glycol, neopentyl glycol, polyethylene glycol, 1,4-cyclohexanedimethanol and p-xylylene glycol; other dicarboxylic acid components such as adipic acid, sebacic acid, phthalic acid, isophthalic acid and 5-sodium sulfoisophthalic acid; oxycarboxylic acid components such as p-oxyethoxybenzoic acid; and the like. The amount of the above comonomer is preferably 20 mol % or less, more preferably 10 mol % or less, based on the total amount of the acid components.

Further, a polyfunctional compound having 3 or more functional groups, such as trimellitic acid or pyromellitic acid, may be copolymerized. In this case, it can be copolymerized in such an amount that the polymer is substantially linear, for example, in an amount of 2 mol % or less.

In the laminate polyester film of the present invention, the polyester resin for forming the base layer (A) may be a resin that substantially contains no added fine particles. The term "added fine particles" denotes fine particles that are intentionally added to the polyester resin or added during the production thereof, and the term "substantially contains no particles" means that 0.001% by weight or more of fine particles are not contained in the resin. Therefore, particles which are generated from a catalyst or a stabilizer during the production of a polyester resin do not come under the category of the added fine particles.

It is desirable that the polyester resin for forming the base layer (A) should substantially not contain added fine particles as described above. However, the polyester resin may contain a certain amount of fine particles having a specific size depending upon a purpose. When added fine particles are incorporated into the polyester resin for the base layer (A), the average particle diameter of the added fine particles is 0.005 to 0.3 μm, preferably 0.01 to 0.2 μm, particularly preferably 0.02 to 0.2 μm, and the content thereof is 0.001 to 0.1% by weight, preferably 0.005 to 0.08% by weight. When the above fine particles are contained in the polyester of the base layer (A), the running durability of a laminate polyester is improved. When the average particle diameter of the added fine particles exceeds 0.3 μm, undesirably, the polyester film is poor in electromagnetic conversion characteristics.

In the fine particles contained in the polyester resin of the base layer (A), advantageously, the volume shape factor (f) thereof is in a range of 0.1 to π/6, preferably 0.4 to π/6. The above volume shape factor (f) is defined by the following equation.

$$f = V/R^3$$

wherein f is a volume shape factor, V is a volume (μm$^3$) of a particle and R is an average particle diameter (μm) of the particle.

The shape of a particle having a volume shape factor (f) of π/6 is a sphere (true sphere), and the shape of particles having the volume shape factor (f) of 0.4 to π/6 includes substantially the shape of a sphere (true sphere) to the shape of an elliptic ball like an egg shape. When particles having a volume shape factor (f) of less than 0.1, e.g., flake-shaped particles, are used, it is difficult to attain sufficient running durability.

Further, the relative standard deviation of the particle diameter of the fine particles, defined by the following equation, is preferably 0.5 or less, more preferably 0.3 or less, particularly preferably 0.12 or less. When the relative standard deviation is larger than 0.5, undesirably, the resulting film has insufficient protrusion uniformity.

$$\text{Relative standard deviation} = \frac{\sqrt{\sum_{i=1}^{n}(Di - \overline{D})^2}}{n} \Big/ \overline{D}$$

wherein Di: diameter (μm) of a circle equivalent to an area of each particle $\overline{D}$: average value of diameters of circles equivalent to areas $$\left(=\dfrac{\sum_{i=1}^{n} Di}{n}\right)(\mu m)$$

and n: number of particles.

In the laminate polyester film of the invention, a coating layer (B) is formed on one surface of the base layer (A). The coating layer (B) contains a binder resin, added fine particles and a surfactant, and has a thickness of 3 to 40 nm, preferably 4 to 30 nm. The added fine particles contained in the coating layer (B) have an average particle diameter of 10 to 50 nm, preferably 15 to 45 nm, particularly preferably 18 to 40 nm, and the content thereof based on a solid content (a total amount of the binder resin and the surfactant) of the coating layer (B) is in a range of 0.5 to 30% by weight, preferably 2 to 20% by weight, particularly preferably 3 to 15% by weight, The binder resin in the coating layer (B) includes an aqueous polyester resin, an aqueous acrylic resin and an aqueous polyurethane resin. An aqueous polyester resin is particularly preferred. The aqueous polyester resin will be specifically explained hereinafter.

The above aqueous polyester resin is preferably selected from polyester resins comprising an acid component formed from at least one member selected from polycarboxylic acids such as isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, monopotassium trimellitate and p-hydroxybenzoic acid and a glycol component formed from at least one member selected from polyhydroxy compounds such as ethylene glycol, diethylene glycol, propylene glycol, 1,4-butanediol, 1,6-hexanediol, 1,4-cyclohexane dimethanol, p-xylylene glycol, dimethylol propane and an adduct of bisphenol A with ethylene oxide. Further, the aqueous polyester resin can be also similarly selected from a graft polymer or block copolymer in which an acrylic polymer chain is bonded to a polyester chain, or an acryl-modified polyester resin in which two types of polymers form a specific physical construction (IPN, core-shell) in a micro molecule.

The above aqueous polyester ester resin may be any type that is soluble, emulsifiable or finely dispersible in water, while a type that is emulsifiable or finely dispersible in water is preferred. Further, the aqueous polyester resin may have a molecule containing, for example, a sulfonic acid salt group, a carboxylic acid salt group, a polyether unit, or the like, which is introduced in the molecule for imparting a hydrophilic nature.

The added fine particles in the coating layer (B) is not critical in type so long as the particles have the above average particle diameter. Preferred are fine particles which hardly precipitate in a coating solution for forming the coating layer and have a relatively low specific gravity. Examples thereof preferably include particles of a heat resistant polymer (such as cross-linked silicone resin, cross-linked acrylic resin, cross-linked polystyrene, melamine-formaldehyde resin, aromatic polyamide resin, polyamide-imide resin, cross-linked polyester, wholly aromatic polyester, or the like), silicon dioxide (silica) and calcium carbonate. Of these, a cross-linked silicone resin, silica and core-shell type organic particles (e.g., particles formed of a cross-linked polystyrene as a core and polymethyl methacrylate as a shell) are particularly preferred.

The surfactant in the coating layer (B) is preferably selected from nonionic surfactants, and particularly preferably selected from surfactants prepared by adding (poly) ethylene oxide to an alkyl alcohol, an alkyl phenyl alcohol or a higher fatty acid.

Examples of the above surfactant includes polyoxyethylene alkylphenylether compounds such as "NONION NS-230", "NONION NS-240", "NONION HS-220" and "NONION HS-240" which are trade names and supplied by NOF Corporation and "NONIPOLE 200", "NONIPOLE 400", "NONIPOLE 500" and "OCTAPOLE 400" which are trade names and supplied by Sanyo Chemical Industries Ltd; polyoxyethylene alkylether compounds such as "NONION E-230", "NONION K-220" and "NONION K-230" which are trade names and supplied by NOF Corporation; and higher fatty acid polyoxyethylene ester compounds such as "NONION S-15.4" and "NONION S-40" which are trade names and supplied by NOF Corporation.

The amount of the above surfactant based on the solid content of the coating layer (B) is 10 to 50% by weight, more preferably 12 to 40% by weight, particularly preferably 15 to 30% by weight.

When the amount of the surfactant is less than 10% by weight (based on the total solid content), it is difficult to prevent the generation of coarse protrusions which may cause drop-out. When it exceeds 50% by weight (based on a total solid content), a streak-like coating defect occurs due to foaming.

For improving an anti-blocking property, further, the surfactant preferably has a softening point of 30° C. or higher when measured according to JIS K7206 (using a dry-solidified surfactant for the measurement). For reducing a surface tension of a coating solution so as to prevent a coating failure in spots during the application of the coating solution for forming a coating layer (B), a surfactant other than the above surfactants may be used in combination so long as the amount thereof does not exceed 10% by weight based on the total solid content.

In the laminate polyester film of the present invention, not only the coating layer (B) is required to have the above-described composition and thickness, but also the surface thereof (surface not in contact with the base layer (A)) is required to satisfy the following characteristics (a) to (d):

(a) the surface has 80,000 pieces/mm$^2$ or less, preferably 60,000 pieces/mm$^2$ or less, of protrusions having a major diameter of 0.05 $\mu$m or more when measured on the basis of a surface photograph taken and enlarged at a magnification of 5,000 with a scanning electron microscope, (b) the surface has 1 to 40 pieces/$\mu$m$^2$, preferably 2 to 20 pieces/$\mu$m$^2$, of protrusions, when measured on the basis of a surface photograph taken and enlarged at a magnification of 35,000 with a scanning electron microscope, (c) the surface has 20 pieces/cm$^2$ or less, preferably 10 pieces/cm$^2$, of extra-large protrusions having a major diameter of 10 $\mu$m or more, and (d) the surface has a central plane average roughness (SRa) of 5 nm or less.

The surface characteristics (a) to (d) of the coating layer (B) will be explained further in details.

Of the above surface characteristics of the coating layer (B), the (a) and (c) are characteristics that originate in the influences of the surface characteristics of the base layer (A).

That is, the characteristic (a) is a reflection of protrusions of the base layer (A) surface, which protrusions are mainly ascribed to the added fine particles contained in the polyester resin of the base layer (A). The characteristic (c) is a reflection of protrusions of the base layer (A) surface, which protrusions are mainly ascribed to large particles (i.e., particles formed by precipitation of catalysts or stabilizers, or particles included due to other causes) existing in the polyester resin of the base layer (A).

When the surface of the coating layer (B) is measured on the basis of its scanning electron microscopic photograph taken at a magnification of 5,000, the number of protrusions having a major diameter of 0.05 μm or more is 80,000 pieces/mm² or less, preferably 60,000 pieces/mm² or less, particularly preferably 50,000 pieces/mm² or less. The above number depends mainly on the added fine particles contained in the polyester resin of the base layer (A). When the polyester resin of the base layer (A) contains no added fine particles as described above, the above number of the protrusions is extremely small. When the polyester resin of the base layer (A) contains added fine particles, the lower limit of the number of the protrusions is 10,000 pieces/mm², preferably 20,000 pieces/mm². When the number of the protrusions exceeds 80,000 pieces/mm², undesirably, the film is poor in electromagnetic conversion characteristics.

The surface characteristic (b) of the coating layer (B) is explained below. When the surface of the coating layer (B) is measured on the basis of its scanning electron microscopic photograph taken at a magnification of 35,000, the number of protrusions is 1 to 40 pieces/μm², preferably 2 to 20 pieces/μm². The number of the above protrusions is more preferably 2.5 to 18 pieces/μm², particularly preferably 3 to 15 pieces/μm². The protrusions in the surface characteristic (b) are formed mainly due to the added fine particles contained in the coating layer (B). The number of the above protrusions, therefore, can be brought into the above range by controlling the amount of the added fine particles to be contained in the coating layer (B).

The surface characteristic (c) of the coating layer (B) shows the number of extra-large protrusions. The extra-large protrusions have a major diameter of 10 μm or more, and the number thereof is required to be 20 pieces/cm² or less and it is preferably 10 pieces/cm² or less. When the surface has the extra-large protrusions having a height of higher than 100 nm, there is a high possibility of causing drop-out in the resulting product and hence, the number of extra-large protrusions is desirable to be as small as possible. The number of extra-large protrusions having a height of 100 nm or higher should be 10 pieces/cm² or less, more preferably 5 pieces/cm² or less.

The extra-large protrusions in the surface characteristic (c) are formed mainly due to a variety of large particles contained in the base layer (A) as described above. That is, the above extra-large protrusions are caused mainly by a contaminant which comes from outside during the film formation, or by residual catalyst particles which precipitate during the polymerization and added fine particles which are poorly dispersed. In most cases, they are caused by the residual catalyst particles and the poorly dispersed added fine particles. When the density of the extra-large protrusions exceeds 20 pieces/cm², they themselves cause dropout. When the protrusions are caused by the poorly dispersed added fine particles, undesirably, partial abrasion is liable to be caused on a head, and the electromagnetic conversion characteristics are also caused to be poor.

For decreasing the number of the extra-large protrusions, there is employed a method in which the dispersibility of the added fine particles in the polyester resin is improved, e.g., a method in which a glycol slurry of added fine particles is filtered through a fine filter in advance to exclude large-sized particles including aggregates and the timing of added fine particles being added in the form of a glycol slurry during the polymerization for the polyester is optimized, or a method in which the rate at which the glycol slurry is added is optimized. Or, it is preferred to carry out a high-precision filtration before a molten polymer is extruded through an extrusion die during the film formation. In the high precision filtration, the size of the average mesh openings of a filter, a metal fiber sintered filter in particular, is preferably 50 to 400 times, more preferably 80 to 300 times, the average particle diameter of the added fine particles. The lower limit of the average mesh openings is preferably 1 μm. It is particularly preferred to combine the optimization of the method of adding the particles with the optimization of the average mesh openings in the high precision filtration.

Further, another means for decreasing the number of the extra-large protrusions is to prevent a catalyst or a stabilizer from precipitating as extra-large particles in the production of polyester. For this purpose, the catalyst to be used is selected in kind and amount, and the amount of the stabilizer is controlled. Use of the catalyst and the stabilizer will be described in detail later.

Further, as a surface characteristic (d), the central plane average roughness (SRa) of the coating layer (B) is 5 nm or less, preferably 4 nm or less. When the surface roughness (SRa) exceeds 5 nm, undesirably, the electromagnetic conversion characteristics comes to be low.

The biaxially oriented laminate polyester film of the present invention may have a thin film layer (C) further laminated on a surface of the base layer (A) which surface is not in contact with the coating layer (B). In this case, the laminate polyester film has a three-layered structure of coating layer (B)/base layer (A)/thin film layer (C), and the so-structured laminate film is a preferred embodiment of the present invention.

The above thin film layer (C) may be a coating layer laminated on the surface of the base layer (A) by application, or it may be a layer laminated on the surface of the base layer (A) by co-extrusion in the film formation of the base layer (A). The latter is more preferred.

The thin film layer (C) contains added fine particles. To distinguish the above added fine particles from the added fine particles in the base layer (A) and the coating layer (B) in explanation, the former will be referred to as "added fine particles C".

When the thin film layer (C) is a coating layer formed by application, the coating layer can be formed of a binder resin and added fine particles C, and may further contain a surfactant.

The binder resin, the added fine particles C and the surfactant can be selected from those binder resins, added fine particles and surfactants which are explained regarding the coating layer (B).

The average particle diameter of the added fine particles C is preferably 0.01 to 0.1 μm, more preferably 0.02 to 0.08 μm, particularly preferably 0.02 to 0.06 μm. The content of the added fine particles C is preferably 0.5 to 30% by weight, more preferably 1 to 20% by weight, particularly preferably 2 to 10% by weight. In this case, as a surfactant, those surfactants may be used alone or in combination. Therefore, the composition of the thin film layer (C) may be the same as that of the coating layer (B).

Further, the thin film layer (C) may be formed of a polyester resin layer containing the added fine particles C, and may be formed together with the base layer (A) by co-extrusion.

In the thin film layer (C), preferably, the layer thickness thereof, the average particle diameter of the added fine particles C and the content thereof satisfy the following relational expression.

$$0.001 \leq (d)^3 \times c \times t \leq 100$$

wherein d is an average particle diameter ($\mu$m) of the added fine particles in the thin film layer (C), c is a content (% by weight) of the added fine particles, and t is a thickness (nm) of the thin film layer (C).

When the thin film layer (C) is a coating layer formed by application, advantageously, it satisfies the following relational expression.

$$0.001 \leq (d)^3 \times c \times t \leq 0.1$$

When the thin film layer (C) is a layer formed together with the base layer (A) by co-extrusion, advantageously, it satisfies the following relational expression.

$$0.1 \leq (d)^3 \times c \times t \leq 100$$

In this case, the thin film layer (C) formed by co-extrusion contains the added fine particles C. The added fine particles C have the following average particle diameter and the following content.

The average particle diameter (d) of the added fine particles C is preferably 0.1 to 1 $\mu$m, more preferably 0.15 to 0.8 $\mu$m, particularly preferably 0.2 to 0.7 $\mu$m. The content of the added fine particles C having the above average particle diameter (d) is preferably 0.0001 to 1% by weight, more preferably 0.001 to 0.5% by weight, particularly preferably 0.005 to 0.1% by weight, based on the polyester resin or the binder resin of the thin film layer (C).

Examples of the added fine particles C preferably include (1) heat resistant polymer particles (such as particles of cross-linked silicone resin, cross-linked polystyrene, cross-linked acrylic resin, melamine-formaldehyde resin, aromatic polyamide resin, polyimide resins, polyamide-imide resin or cross-linked polyester), (2) metal oxides (such as aluminum sesquioxide, titanium dioxide, silicon dioxide, magnesium oxide, zinc oxide and zirconium oxide), (3) metal carbonates (such as magnesium carbonate and calcium carbonate), (4) metal sulfates (such as calcium sulfate and barium sulfate), (5) carbon (such as carbon black, graphite and diamond) and (6) clay minerals (such as kaolin, clay and bentonite). Of these, cross-linked silicone resin particles, cross-linked polystyrene particles, melamine-formaldehyde resin particles, polyamide-imide resin particles, aluminum sesquioxide (alumina), titanium dioxide, silicon dioxide, zirconium oxide, synthetic calcium carbonate, barium sulfate, diamond and kaolin are preferred, and cross-linked silicone resin particles, cross-linked polystyrene particles, alumina, titanium dioxide, silicon dioxide and calcium carbonate are particularly preferred.

Further, when the inert fine particles are particles of two or more types, colloidal silica and fine particles of alumina having $\alpha$, $\gamma$, $\delta$, or $\theta$ crystal form are preferably used in combination as second and third particles having an average diameter smaller than the average particle diameter (d) of the added fine particles C. Of particle species shown as the added fine particles C having the average particle diameter (d), fine particles having a small average particle diameter may be used as well.

The average particle diameter of the above fine particles is preferably in the range of from 5 to 400 nm, more preferably 10 to 300 nm, particularly preferably 30 to 250 nm, and is smaller than the above average particle diameter (d) preferably by 50 nm or more, more preferably by 100 nm or more, particularly preferably by 150 nm or more. The content of the second and third particles (fine particles) based on the thin film layer (C) resin is preferably 0.005 to 1% by weight, more preferably 0.01 to 0.7% by weight, particularly preferably 0.05 to 0.5% by weight.

The thickness of the thin film layer (C) is 5 nm or more, preferably 8 nm or more. Desirably, the upper limit of the above thickness is ½ or less, preferably ⅓ or less, particularly preferably ¼ or less, of the total thickness of the laminate polyester film.

The biaxially oriented laminate polyester film of the present invention preferably has an air leak index, measured with the Bekk smoothness tester of Toyo Seiki Co. Ltd, of 0.1 to 2 KPa/hr owing to the presence of the above thin film layer (C).

The biaxially oriented laminate polyester film of the present invention is improved in handling properties and wind-up properties without impairing electromagnetic conversion characteristics, since it has the above thin film layer (C) and exhibits an air leak index in the above value range.

When the thin film layer (C) is laminated by co-extrusion, advantageously, the air leak index is 0.1 to 1.3 KPa/hr, preferably 0.3 to 1 KPa/hr.

In the biaxially oriented laminate polyester film of the present invention, when polyethylene terephthalate is used as a polyester resin for the base layer (A) or the thin film layer (C), the polyethylene terephthalate has an intrinsic viscosity in the range of from 0.4 to 0.9. The intrinsic viscosity is calculated on the basis of a viscosity obtained by measurement of a solution thereof in o-chlorophenol at 35° C.

The total thickness of the biaxially oriented laminate polyester film of the present invention is generally 2.5 to 20 $\mu$m, preferably 3.0 to 12 $\mu$m, more preferably 4.0 to 12 $\mu$m.

The biaxially oriented laminate polyester film of the present invention can be produced by a method known per se or according to methods accumulated in the fieled of this art. Of these, a laminate structure of the base layer (A) and the thin film layer (C) is preferably produced by a co-extrusion method, and the coating layer (B) is preferably laminated by an application method.

For example, the case of laminating a base layer (A) and a thin film layer (C) by a co-extrusion method using a polyethylene terephthalate resin as the polyester resin will be explained. A polyethylene terephthalate resin A containing the foregoing added fine particles finely dispersed therein and a polyethylene terephthalate resin C containing the added fine particles C finely dispersed therein are further filtrated through a high-precision filter respectively, and then laminated together in a molten state, within an extrusion die or before an extrusion die (the former is generally called "a multi-manifold system", and the latter, "a feed block system") to form a laminate structure having the above proper thickness ratio, and then the laminate structure is co-extruded in the form of a film from the die at a temperature between melting point Tm° C. and (Tm+70)° C. and quenched on a cooling roll at 40 to 90° C. to solidness to obtain an unstretched laminate film. Thereafter, the unstretched laminate film is stretched at a stretch ratio of 2.5 to 8.0, preferably 3.0 to 7.5, in the uniaxial direction (in the longitudinal or transverse direction) at a temperature between (Tg−10) and (Tg+70)° C. (Tg: glass transition temperature of the polyethylene terephthalate) and then stretched at a stretch ratio of 2.5 to 8.0, preferably 3.0 to 7.5, in the direction perpendicular to the above direction at a temperature between Tg and (Tg+70)° C. according to a conventional method. Further, the laminate film may be re-stretched in the longitudinal direction and/or transverse direction as required. That is, two-stage, three-stage, four-stage or multi-stage stretching may be carried out. The total stretch ratio is generally 9 or more, preferably 12 to 35, more preferably 15 to 30, in terms of an area stretch ratio. Further, the biaxially oriented polyethylene terephthalate film is heat-set and crystallized at a temperature between (Tg+70) and (Tm−10)° C., for example, between 180 and 250° C., whereby it is imparted with excellent dimensional stability. The time period for the heat-setting is preferably 1 to 60 seconds.

The coating layer (B) is formed by applying a coating solution, preferably aqueous coating solution, containing the above added fine particles, the above binder resin and the above surfactant onto a co-extruded polyester film. Preferably, the coating solution is applied onto the surface of the polyester layer (A) that has not been finally stretched, and then, the coated polyester film is stretched at least in one direction. The coating film is dried before or during the stretching. The application of the coating solution is preferably performed on an unstretched laminate film or longitudinally (uniaxially) stretched laminate film. Particularly preferably, the application is performed on a longitudinally (uniaxially) stretched laminate film. The coating method is not critical, and it includes a roll coating method and a die coating method.

The solid content in the above coating solution, particularly the aqueous coating solution, is preferably 0.2 to 8% by weight, more preferably 0.3 to 6% by weight, particularly preferably 0.5 to 4% by weight. The coating solution (preferably, aqueous coating solution) may contain other components such as other surfactant, stabilizer, dispersant, UV absorber or thickener so long as the effect of the present invention is not impaired.

In the production of the laminate polyester film, additives other than the above added fine particles, such as a stabilizer, a colorant, a resistivity control agent for a molten polymer or the like may be added to the polyester resin, as desired.

In the present invention, for improving various functions as a magnetic recording medium, such as head touch, running durability or the like, and for decreasing the thickness of the film at the same time, the Young's moduli of the laminate polyester film in the longitudinal direction and in the transverse direction are preferably at least 450 kg/mm$^2$ and at least 600 kg/mm$^2$, more preferably at least 480 kg/mm$^2$ and at least 680 kg/mm$^2$. When the polyester is polyethylene terephthalate, the crystallinity is desirably 30 to 50%. When the crystallinity is lower than the lower limit, the thermal shrinkage factor is large. When it exceeds the upper limit, the abrasion resistance of the film is poor, and white powders are liable to be formed when the film runs being in contact with a roll or a guide pin surface.

A preferred process for producing a polyester resin suitable for forming the base layer (A) in the present invention will be explained below. As described above, in the surface characteristics of the coating layer (B) of the surface of the base layer (A), the number of the extra-large protrusions is required to be extremely few. It is therefore essential to control the formation of large precipitated particles caused by a catalyst or a stabilizer in the polyester resin, which is one of the causes of formation of the extra-large protrusions. The present inventors have therefore made studies and have found that a base layer (A) containing few extra-large protrusions can be obtained by selecting a type and an amount of the catalyst, and bringing the content of the stabilizer into a specific amount ratio, in the polyester resin forming the base layer (A).

That is, preferably, the base layer (A) in the laminate polyester film of the present invention is a film formed of a polyester resin which contains (a) at least one compound selected from the group consisting of an alkali metal compound, an alkaline earth metal compound and a manganese compound, (b) a phosphorus compound and (c) at least one compound selected from the group consisting of a germanium compound, a titanium compound and an antimony compound in an amount ratio satisfying the following expressions (1) to (6) simultaneously:

$$25 \leq M \leq 250 \quad (1)$$

$$0.1 \leq (M/P) \leq 6.0 \quad (2)$$

$$0 \leq Ti \leq 12.5 \quad (3)$$

$$0 \leq Ge \leq 110 \quad (4)$$

$$0 \leq Sb \leq 50 \quad (5)$$

$$0.3 < (Ti+Ge) \leq 110 \quad (6),$$

wherein M is a content (ppm) of a total of an alkali metal element, an alkaline earth metal element and a manganese element from the compound (a), P is a content (ppm) of a phosphorus element, Ti is a content (ppm) of a titanium element, Ge is a content (ppm) of a germanium element and Sb is a content (ppm) of an antimony element, in the polyester.

The alkali metal element, alkaline earth metal element, manganese element, phosphorus element, titanium element, antimony element and germanium element exist alone or as complex compounds in the polyester. It is therefore required to optimize the contents and the ratio of these elements of alkali metal, alkaline earth metal, manganese, phosphorus, titanium, antimony and germanium.

Preferably, the compounds of the above elements have functions capable of improving the activity of a reaction catalyst and stabilization properties during the polyester production or electrostatic adhesion properties during the film production. For example, the alkali metal compound and the alkaline earth metal compound are preferably selected from oxide, chloride, carbonate, carboxylate or acetate of a lithium, sodium, potassium, rubidium, cesium, beryllium, magnesium, calcium, strontium or barium element. Particularly preferred is an acetate of lithium, sodium, potassium, cesium, magnesium, calcium or barium element.

The manganese compound is preferably selected from oxide, chloride, carbonate or carboxylate, and an acetate is particularly preferred.

Further, the phosphorus compound is preferably selected, for example, from phosphoric acid, a phosphate ester such as trimethyl phosphate, triethyl phosphate, triphenyl phosphate or acidic methyl phosphate ester, phosphorous acid, a phosphate ester such as trimethyl phosphate, methylphosphonic acid, phenylphosphonic acid, benzylphosphonic acid, a phosphonate ester such as methyl methylphosphonate, ethyl phenylphosphonate or phenyl benzylphosphonate, trimethyl phosphate, triethyl phosphate, or tri-n-butyl phosphate.

The titanium compound is preferably selected, for example, from titanium tetrabutoxide, titanium trimellitate, tetraethoxytitanium, titanium sulfate or titanium chloride.

The germanium compound is preferably selected, for example, from amorphous germanium dioxide, hexagonal germanium dioxide, germanium chloride or germanium phosphate.

The antimony compound is selected, for example, from antimony trioxide, antimony pentoxide, antimony acetate, antimony potassium tartrate, antimony oxychloride or triphenyl antimony.

The above compounds are preferably soluble in glycol, and can be used alone or in combination of two or more.

The total content (M) of an alkali metal element, an alkaline earth metal element and a manganese element in the polyester is required to be in the range of from 25 to 250 ppm, and it is preferably in the range of from 50 to 200 ppm (the above requirement (1)). When the above content is less than 250 ppm, for example, the ester interchange reaction is deferred in the production of polyester by an ester interchange method, and a film is poor in electrostatic adhesion properties, which decreases the productivity of the film. When the above content exceeds 250 ppm, precipitated particles are formed due to compounds of elements contained, and the surface flatness of the formed film is poor.

Further, in the present invention, the ratio (M/P) (a ratio of values of a ppm unit) of the total content (M) of an alkali metal element, an alkaline earth metal element and a manganese element to the content of a phosphorus element (P) in the polyester is required to be in the range of from 0.1 to 6.0, and it is preferably in the range of 0.5 to 4.5, more preferably in the range of 0.5 to 2.0 (the above requirement (2)). When the above ratio is less than 0.1 or when it is more than 6.0, precipitated particles are formed due to compounds of elements contained, resulting in a poor surface flatness of a formed film.

The polyester is required to contain a titanium compound, a germanium compound or an antimony compound as a polycondensation catalyst. The content of the titanium compound is required to be 12.5 ppm or less, and it is preferably 7 ppm or less. When the above amount is more than 12.5 ppm, undesirably, the durability against deterioration under dry heat is low during the film formation.

The content of the germanium element is required to be 110 ppm or less, and it is preferably 80 ppm or less. When the above amount exceeds 110 ppm, the durability against deterioration under dry heat is low during the film formation.

Further, the content of the antimony element is required to be 50 ppm or less, and it is preferably 25 ppm or less. When the above amount is more than 50 ppm, black foreign matter is liable to be formed due to the antimony. Particularly when polyethylene terephthalate is used, undesirably, foreign matters come to noticeably increase with the passage of time during the film formation (the above requirements (3) to (5)).

Furthermore, of the above catalysts as a polycondensation catalyst, it is preferred to use the titanium compound and the germanium compound in a total amount of 0.3 to 110 ppm, preferably 1 to 80 ppm (the above requirement (6)).

In the production of the polyester, The timing and the method of adding the alkali metal compound, the alkaline earth metal compound, the manganese compound, the phosphorus compound, the titanium compound, the germanium compound and the antimony compound are not critical. For example, it is preferred to add the alkali metal compound, the alkaline earth metal compound and/or the manganese compound until the intrinsic viscosity of a reaction product reaches 0.2. In the ester interchange method, it is preferred to add the compound(s) before initiation of the ester interchange reaction, since it (they) can be used as an ester interchange catalyst. The above reaction may be carried out at atmospheric pressure or under elevated pressure, and it is preferred to carry out the reaction under elevated pressure, since the reaction time period can be decreased. Concerning the order of addition, the compounds may be added simultaneously or separately.

For example, in the ester interchange method, the phosphorus compound is added preferably after substantial completion of the esterification. The phosphorus compound may be added all at once, or may be divided for adding twice or more.

Further, it is preferred to add the titanium compound or the germanium compound at any time that is 10 minutes or more after the addition of the phosphorus compound but is before the intrinsic viscosity reaches 0.3.

Further, the antimony compound may be added at any time before the intrinsic viscosity reaches 0.3.

Since the phosphorus compound deactivates the polymerization catalyst activity of the titanium compound, the reaction time period for the polycondensation can be decreased by adding the phosphorus compound at a last stage of the polycondensation. Further, for example, at least two polymers can be blended in a molten state in an extruder for the film formation. It is also preferred to prepare a master polymer having an increased content of the phosphorus compound and to blend it with a polymer containing the titanium compound.

Further, the polyester may contain other soluble metal component, e.g., a compound containing an Zn element or a Co element, so long as the effect of the present invention is not impaired.

As described above, the number of the extra-large protrusions in the base layer (A) can be controlled by using the catalysts and stabilizers in combination so as to satisfy the requirements (1) to (6). Further, according to the studies made by the present inventors, it has been found that the number of the extra-large protrusions in the base layer (A) can be decreased by another combination different from the above combination.

That is, in the laminate polyester film of the present invention, the base layer (A) is preferably a film formed of a polyester resin which contains a magnesium compound, a calcium compound, a titanium compound and a phosphorus compound in an amount ratio satisfying the following expressions (7) to (10) simultaneously.

$$25 \leq (Mg+Ca) \leq 200 \tag{7}$$

$$0.3 \leq Mg/Ca \leq 10 \tag{8}$$

$$0.5 \leq (Mg+Ca)/P \leq 6.0 \tag{9}$$

$$0.3 \leq Ti \leq 12.5 \tag{10},$$

wherein Mg, Ca, Ti and P show contents (ppm) of a magnesium element, a calcium element, a titanium element and a phosphorus element in the polyester, respectively.

In the above polyester, the calcium compound and the magnesium compound used for its production are preferably selected from oxides, chlorides, carbonates or carboxylates of these compounds, and acetates such as calcium acetate and magnesium acetate are particularly preferred.

These calcium and magnesium compounds may be added at any stage of the polyester production steps.

The above calcium compound and the above magnesium compound have an effect of decreasing the specific resistance, for example, of a molten polyalkylene naphthalate. They can be also used as an ester interchange reaction catalyst when an ester interchange reaction of dimethyl naphthalenedicarboxylate and aliphatic glycol is employed in the stage of polymer production. For this reason, when these compounds are used as the ester interchange reaction catalysts, they are added before initiation of the ester interchange reaction.

When it is not required to work the calcium compound and the magnesium compound as a catalyst, the timing of adding them is not specially limited. In an preferred embodiment, they are added before the intrinsic viscosity of the reaction product reaches 0.2, since it is easy to disperse these compounds homogeneously in the polymer. In this case, they may be added together at the same time, or they may be added separately one in one time and the other in another time. The esterification can be carried out in the absence of a catalyst.

The above calcium compound and the above magnesium compound are used in such an amount that the total content of calcium and magnesium elements in the polyester is 25 to 200 ppm, preferably 50 to 180 ppm, particularly preferably 70 to 160 ppm (requirement (7)). For example, when the polymer is produced by an ester interchange method, the magnesium compound and the calcium compound are added as ester interchange catalysts in such an amount that they are soluble in the reaction system. When the above amount exceeds 200 ppm, undesirably, the surface flatness of a formed film is affected by an influence of precipitated particles caused by the catalysts. When the content is less than 25 ppm, undesirably, not only the ester interchange in the production of the polyester by an ester interchange method proceeds insufficiently, but also the subsequent polymerization proceeds slowly.

The amount ratio (Mg/Ca) of magnesium to calcium by the unit of ppm is 0.3 to 10, preferably 0.5 to 9, particularly preferably 2.0 to 8.0 (requirement (8)). When the above ratio is less than 0.3, the surface flatness of a formed film is affected by the influence of precipitated particles caused by the catalysts. When the ratio exceeds 10, undesirably, a formed film is poor in various characteristics.

Further, the ratio of the total amount of magnesium and calcium to the amount of a phosphorus compound by the unit of ppm is 0.5 to 6.0, preferably 1.0 to 5.0, particularly preferably 2.0 to 5.0 (requirement (9)). When the above ratio by the unit of ppm exceeds 6, undesirably, the surface flatness of a formed film is affected by an influence of precipitated particles caused by the catalysts. When the above ratio is less than 0.5, undesirably, the phosphorus compound is present in an excess amount relative to the ester interchange catalysts, so that the polycondensation proceeds slowly.

The phosphorus compounds to be used are selected from those compounds described with regard to the above polyester.

The phosphorus compound can be added before the polyester is formed into a film. For example, it may be added after completion of the esterification or the ester interchange reaction, or it may be added just before the polycondensation. The phoshprus compound may be added all at once, or may be divided into two or more portions for adding them. Further, at least two polymers can be blended in a molten state in an extruder for the film formation. It is also preferred to employ a method, for example, in which a master polymer having an increased content of the phosphorus compound is prepared and then, blended with a polymer containing the titanium compound and the inert fine particles to obtain a polymer (composition) which satisfies the above requirements (7) to (10).

Although not specially limited, the titanium compound for use preferably includes, for example, titanium tetrabutoxide, titanium trimellitate, tetraethoxytitanium, titanium sulfate and titanium chloride. Of these, titanium tetrabutoxide and titanium trimellitate are particularly preferred.

In the ester interchange method, the above titanium compound may be added before initiation of the ester interchange reaction, during the ester interchange reaction, after completion of the ester interchange reaction or just before the polycondensation reaction. In the esterification method, further, it may added after completion of the esterification or just before the polycondensation.

The content of the titanium compound as a titanium element in the polyester is 0.3 to 12.5 ppm, preferably 1 to 10 ppm. When the above content exceeds 12.5 ppm, the film is liable to deteriorate under dry heat due to the titanium. When it is less than 0.3 ppm, undesirably, the polymerization proceeds slowly.

According to the present invention, there is also provided a magnetic recording medium having the above biaxially oriented laminate polyester film as a base film, i.e., a magnetic recording medium comprising the above biaxially oriented polyester film and a magnetic layer present on the coating layer (B) of the above laminate film.

A working embodiment of production of the magnetic recording medium of the present invention is as follows.

A ferromagnetic metal thin film layer of iron, cobalt, chromium or an alloy or oxide composed mainly of these is formed on the surface on the coating layer (B) of the above biaxially oriented laminate polyester film by a vacuum vapor deposition, sputtering or ion plating method, a protective layer of diamond-like carbon (DLC) or the like, and a fluorine-containing carboxylic acid lubricant layer are consecutively formed on the surface thereof depending upon a purpose, use or necessity, and further a back coating layer is formed on the surface on the thin film layer (C) side by a known method as required, whereby there can be produced a high-density-recording deposited magnetic recording medium which is excellent in output in a short-wavelength region and electromagnetic conversion characteristics such as S/N and C/N and of which the drop-out and the error rate are decreased. The above deposited magnetic recording medium is very useful as a tape medium for an Hi8 for analog signal recording and a digital video cassette recorder (DVC), 8 mm data recorder and DDSIV for digital signal recording.

A needle-shaped fine magnetic powder (metal powder) formed of iron or formed of iron as a main component is homogeneously dispersed in a binder such as polyvinyl chloride or a vinyl chloride-vinyl acetate copolymer, the dispersion is applied onto the surface of the coating layer (B) of the above biaxially oriented laminate polyester film so as to form a magnetic layer having a thickness of 1 $\mu$m or less, preferably 0.1 to 1 $\mu$m, and a back coat layer is formed on the surface on the thin film layer (C) side by a known method as required, whereby there can be produced a high-density-recording metal coated magnetic recording medium which is excellent in output in a short wavelength region and electromagnetic conversion characteristics such as S/N and C/N and of which the drop-out and the error rate are decreased. Further, as required, there may be employed a constitution in which fine titanium oxide particles are dispersed in the same organic binder as that used for forming the magnetic layer and the dispersion is applied onto the base layer (A) to form a non-magnetic layer as an undercoating layer for the above metal powder-containing magnetic layer. The above metal coated magnetic recording medium is very useful as a magnetic tape medium for 8 mm video, Hi8, β-cam SP and W-VHS for analog signal recording and digital video cassette recorder (DVC), 8 mm data recorder, DDSIV, digital β-cam, D2, D3 and SX for digital signal recording.

Further, a needle-shaped fine magnetic powder of iron oxide or chromium oxide or a sheet-like fine magnetic powder such as barium ferrite is homogeneously dispersed in a binder such as polyvinyl chloride or vinyl chloride-vinyl acetate copolymer, the dispersion is applied onto the surface of the coating layer (B) of the above biaxially oriented laminate polyester film to form a magnetic layer having a thickness of 1 µm or less, preferably 0.1 to 1 µm, and a back coat layer is formed on the surface on the thin film layer (C) side by a known method as required, whereby there can be produced a high-density-recording oxide coated magnetic recording medium which is excellent in output in a short wavelength region and electromagnetic conversion characteristics such as S/N and C/N and of which the drop-out and the error rate are decreased. Further, as required, there may be employed a constitution in which fine titanium oxide particles are dispersed in the same organic binder as that used for forming the magnetic layer and the dispersion is applied onto the thin film layer (C) to form a non-magnetic layer as an undercoating layer for the above magnetic-powder-containing magnetic layer. The above oxide coated agnetic recording medium is useful as a high-density oxide coated magnetic recording medium such as QIC for a data streamer of digital signal recording.

The above W-VHS is a VTR for analog HDTV signal recording, and the above DVC is applicable to digital HDTV signal recording. It can be said that the biaxially oriented laminate polyester film of the present invention is a base film remarkably useful for a magnetic recording medium for the VTRs applicable to HDTV signals.

EXAMPLES

The present invention will be explained further in detail with reference to Examples hereinafter, while the present invention shall not be limited by these Examples. In the Examples and Comparative Example, "part" and "%" are on the weight basis unless otherwise specified. Physical property values and characteristic properties in the present invention were measured and are defined according to the following methods.

Intrinsic Viscosity

Determined on the basis of a value measured in an orthochlorophenol solution at 35° C.

Average Particle Diameter I of Particles (Average Particle Diameter: 0.06 µm or Larger)

Measured with a "SACP-4L model Centrifugal Particle Size Analyzer" (trade name) supplied by Shimadzu Corporation. On the basis of an obtained centrifugal sedimentation curve, a cumulative curve of particles of each diameter and the amount thereof is calculated. In the cumulative curve, a particle diameter equivalent to 50 mass percent "equivalent spherical diameter" is read and taken as an average particle diameter (see a book "Particle Size Measurement Technology" issued by Nikkan Kogyo Press, pp. 242–247, 1975).

Average Particle Diameter II of Particles (Average Particle Diameter: Smaller than 0.06 µm)

Particles having an average particle diameter of smaller than 0.06 µm, for forming small projections, are measured by a light scattering method. That is, it is expressed by "equivalent sphere diameter" of the particles, which corresponds to the particle size at a point of 50% by weight of the total particles, obtained by the "NICOMP MODEL 270 SUBMICRON PARTICLE SIZER" (trade name) supplied by Nicomp Instruments Inc.

Thickness of Each of Polyester Resin Layer (A). Coating Layer (B) and Thin Film Layer (C), and Total Thickness of Film A film is measured for thickness at 10 locations at random with a micrometer, and an average value of the measurement values is taken as a total thickness of the film. Of the layer A and the thin film layer C, a thin layer is measured for a thickness by the following method, while the thickness of a thick layer is obtained by subtracting the thickness of the coating layer and the thickness of the thin layer from the total thickness.

That is, with a secondary ion mass spectrometer (SIMS), the concentration ratio ($M^+/C^+$) of a metal element ($M^+$) based on particles having the highest concentration among the particles contained in a region ranging from the surface layer excluding the coating layer to a level 5,000 nm deep in the film to the carbon element ($C^+$) of a polyester is taken as a particle concentration, and the region ranging from the surface layer to a level 5,000 nm deep in the film is analyzed in the thickness direction of the film. The surface layer has a lower particle concentration since it constitutes an interface that is a surface, but the particle concentration increases as the distance from the surface increases. The present invention includes two cases: one case where the particle concentration comes to a stable value 1 once and then increases to a stable value 2, and the other case where the particle concentration comes to a stable value 1 once and then simply decreases. On the basis of these distribution curves, a depth which gives a particle concentration of (stable value 1+stable value 2)/2 is taken as the thickness of the layer in the former case, and a depth which gives a particle concentration of one-half of the stable value 1 (deeper than the depth that gives a stable value 1) is taken as the thickness of the layer in the latter case.

Measurement conditions are as follows.

(1) Measurement Instrument

Secondary ion mass spectrometer (SIMS): 6300 model of PERKIN ELMER Inc.

(2) Measurement Conditions

Species of primary ion: $O_2+$

Acceleration voltage of primary ion: 12 kV

Primary ion current: 200 nA

Luster area: 400 µm□

Analysis area: gate 30%

Measurement vacuum degree: $6.0 \times 10^{-9}$ Torr

E-GUNN: 0.5 kV–3.0 A

When the most of the particles contained in a region ranging from the surface layer to a level 5,000 nm deep are organic polymer particles other than a silicone resin, measurement with SIMS is difficult. Therefore, while the film is etched from the surface, a concentration distribution curve similar to the above is measured by FT-IR (Fourier transformed infrared spectrometry) or XPS (X-ray photo-electron spectrometry) depending on some particles, to determine a thickness of the layer.

The above measurement methods are effective for measuring co-extruded layers. In a coating layer, a small piece of a film is fixed with an epoxy resin and an ultra-thin piece having a thickness of about 60 nm is prepared with a microtome (by cutting the piece in parallel with the flow direction of the film). The sample is observed through a transmission electron microscope (Model H-800 supplied by Hitachi, Ltd.) to determine the thickness of the layer from the interface surface of the layers.

Density of Protrusions on Surface of Coating Layer (B) Through Scanning Electron Microscope (Measured at a Magnification of 5.000)

The density of protrusions on the surface of a film is measured through a scanning electron microscope. That is, 25 photos of the surface of the coating layer (B) of a biaxially oriented polyester film are taken at random at a magnification of 5,000 to count the number of protrusions having the major diameter of at least 0.05 μm, and the number of protrusions per 1 mm² is calculated from an average value of the counts and taken as the density of protrusions.

Density of Protrusions on Surface of Coating Layer (B) Through Scanning Electron Microscope (Measured at a Magnification of 35,000)

The density of protrusions on the surface of a film is measured through a scanning electron microscope. That is, 25 photos of the surface of the coating layer (B) of a biaxially oriented polyester film are taken at random at a magnification of 35,000 to count the number of protrusions on the surface, and the number of protrusions per 1 μm² is calculated from an average value of the counts and taken as the density of protrusions.

Central Plane Average Roughness (SRa)

With a non-contact three-dimensional roughness meter "TOPO-3D" (trade name) supplied by WYKO Co., Ltd., measurements are made under conditions of a measurement magnification of 40× and a measurement area of 242 μm×239 μm (0.058 mm²) to obtain a profile (original data) of the surface roughness. SRa is calculated on the basis of the following equation according to surface analysis with the built-in software of the above roughness meter, and its output value is used.

$$SRa = \sum_{k=1}^{M} \sum_{j=1}^{N} |Z_{jk} - \overline{Z}|/(M \cdot N)$$

$$\text{wherein } \overline{Z} = \sum_{k=1}^{M} \sum_{j=1}^{N} |Z_{jk}|/(M \cdot N)$$

$$M = 256$$

$$N = 256$$

$Z_{jk}$ is a height on a three-dimensional roughness chart at a j-th position and a k-th position in the directions when a measurement direction (242 μm) and a direction (239 μm) perpendicular to it are divided into M and N sections, respectively.

Number of Extra-large Protrusions (Protrusions Having a Major Diameter of 10 μm or More)

Through an optical microscope "OPTIPHOT" (trade name) supplied by Nikon Corporation, the surface of the coating layer (B) having aluminium deposited thereon at a thickness of 0.5 μm is observed in a region of 1 cm×5 cm at a magnification of 200 by a differential interference method to count protrusions having a major diameter of 10 μm or more, and the number of protrusions per 1 cm² is calculated from the count and taken as the number of extra-large protrusions.

Number of Extra-large Protrusions (Protrusions Having a Height of 100 nm or Higher)

With a non-contact three-dimensional roughness meter "TOPO-3D" (trade name) supplied by WYKO Co., Ltd., the above extra-large protrusions having a major diameter of 10 μm or more are measured under conditions of a measurement magnification of 40× and a measurement area of 242 μm×239 μm (0.058 mm²) to obtain a profile (original data) of the surface roughness. On the basis of surface analysis using the built-in software of the above roughness meter, the value of the maximum height from the base line is taken as a height of protrusion, and protrusions having a height of 100 nm or more are counted. The number of the protrusions per 1 cm² is calculated and taken as the number of extra-large protrusions.

Young's Modulus

With a tensile tester "Tensilon" (trade name) supplied by Toyo Baldwin Co., a sample film having a length of 300 mm and a width of 12.7 mm is tensioned at a strain rate of 10%/minute in a room adjusted to a temperature of 20° C. and a humidity of 50% and Young's modulus of the sample film is calculated on the basis of the following equation using an initial straight line portion of a tensile stress-strain curve.

$$E = \Delta\sigma/\Delta\epsilon$$

wherein E is a Young's modulus (N/mm²), Δσ is a stress difference between two points on a straight line on the basis of the original average cross section, and Δε is a strain difference between the same two points.

Air Leak Properties

With a Bekk flatness tester supplied by Toyo Seiki Co. Ltd, 40 films are stacked up, a 5 mm-diameter hole is made through the stacked films excluding the uppermost film, and these 39 films having the hole are set on the sample stand. In this case, the central portion of the hole is positioned so as to come to the center of the sample stand. In this state, a load of 0.5 kg/cm² is applied to the stacked-up films and a vacuum degree to be reached is set to 550 mmHg (73 KPa). After the vacuum degree of 550 mmHg (73 KPa) is reached, air flows through spaces between films to recover an atmospheric pressure. At this point, the falling vacuum degree (mmHg) (KPa) is measured every 30 seconds for 1 hour and the inclination of a straight line (=mmHg/hr) (=KPa/hr) is taken as an air leak index G when the vacuum degree with respect to the measurement time (hr) is approximated to the straight line.

Durability of Film Against Deterioration Under Dry Heat

A film is uniformly stretched on a fixing frame. The film is placed in a preheated hot-air dryer and treated at a temperature for 3 minutes (treatment conditions: temperature set at 240° C., an atmosphere of air). After the treatment, the film is taken out and manually evaluated for deterioration.

[Evaluation Based on 3-Grade Criteria]

⊙ Film is almost free from deterioration and is not broken even if it is strongly pulled by hands.

Δ A Film retains its shape but is broken when pulled strongly by hands.

X Film comes to be powdery and is extremely deteriorated.

Qualitative and Quantitative Analysis of Metal in Polyester

A sample is washed and dried at least twice with distilled acetone and then is collected in an amount of 0.200 g. Then, it is wet-decomposed with sulfuric acid, nitric acid or the like of guaranteed reagent, and 20 ml of a deionized distilled water is added thereto to prepare a sample solution. The sample solution is measures with a high-frequency plasma emission spectroscopic analyzer (Atomu Comp Siries 800 supplied by Jarrell-Ash Division, Fisher Scientific Company) to conduct metal qualitative and quantitative analysis.

Production of Magnetic Tape and Evaluation of Characteristic Properties Thereof

Two 100% cobalt ferromagnetic thin layers (each layer having a thickness of about 0.1 $\mu$m) are formed on the surface of the coating layer (B) of a biaxially oriented laminate film by a vacuum vapor deposition method, such that the two layers have a thickness of 0.2 $\mu$m. A diamond-like carbon (DLC) film layer and a fluorine-containing carboxylic acid-based lubrication layer are consecutively formed on the surface thereof, and a back coat layer is further formed on the surface of the thermoplastic resin C side by a known method. Thereafter, the resulting laminate film is slit into an 8 mm wide tape, and the tape is loaded into a commercially available 8 mm video cassette. Then, the tape is measured for characteristic property values with the following commercially available measurement instruments.

Instruments used: 8 mm video tape recorder "EDV-6000" (trade name) supplied by Sony Corporation C/N measurement: noise meter supplied by Shibasoku Co., Ltd.

C/N Measurement

A signal having a recording wavelength of 0.5 $\mu$m (frequency of about 7.4 MHz) is recorded, the ratio of values at 6.4 MHz and 7.4 MHz of its reproduced signal is taken as C/N of a tape, and the C/N is evaluated on the basis of the following criteria on an assumption that the C/N of a commercially available deposited tape for a 8 mm video is 0 dB.

⊚: +5 dB or more as compared with commercially available 8 mm tape

○: +1 dB or more but less than +5 dB as compared with commercially available 8 mm tape X: less than +1 dB as compared with commercially available 8 mm tape Drop-out With a drop-out counter of Shibasoku Co., Ltd, drop-outs of 3 $\mu$sec/10 dB or more are measured for 10 minutes, and the obtained number is converted to a number per minute.

○: number of drop-outs less than 6/minute

X: number of drop-outs 6 or more/minute

Running Durability 4.2 MHz image signals are recorded on the above deposited tape, and a running of the tape at a running speed of 41 m/minute and a rewinding speed of 41 m/minute under the conditions of a temperature 25° C. and a humidity 50%RH is taken as one cycle, and a variation of output is studied after the running is repeated 200 cycles. The running durability is evaluated on the basis of the following criteria using the variation of output.

⊚: The output variation after 200 cycles of the running is 0 dB to −0.3 dB.

○: The output variation after 200 cycles of the running is −0.3 dB to −0.6 dB

X: The output variation after 200 cycles of the running is −0.6 dB or below

Example 1

100 Parts of dimethyl terephthalate and 70 parts of ethylene glycol were subject to an ester interchange reaction according to a conventional method in the presence of a solution of magnesium acetate tetrahydrate in ethylene glycol (equivalent to 0.045 part as magnesium acetate tetrahydrate) and a solution of calcium acetate monohydrate in ethylene glycol (equivalent to 0.0035 part as calcium acetate monohydrate), each of which solutions was prepared in advance by dissolving magnesium acetate tetrahydrate or calcium acetate monohydrate in ethylene glycol and subjecting the solution to high-precision filtration using a filter having mesh openings of 0.1 $\mu$m (abbreviated as "solution filtration" hereinafter). Then, a solution of trimethyl phosphate in ethylene glycol (equivalent to 0.011 part as trimethyl phosphate) which was subjected to the solution filtration was added to substantially terminate the ester interchange reaction. Then, a solution of titanium trimellitate in ethylene glycol (equivalent to 0.011 part as titanium trimellitate) which was subjected to the solution filtration in advance was added, and thereafter, a polycondensation was carried out under high-temperature and high-vacuum conditions according to a conventional method to give a polyethylene terephthalate resin A having an intrinsic viscosity of 0.60. The polyethylene terephthalate resin A was measured for a content of soluble metal components by means of a plasma emission spectroscopic apparatus (abbreviated as "ICP" hereinafter). Table 1 shows the measurement value.

Further, 100 parts of dimethyl terephthalate and 70 parts of ethylene glycol were subjected to an ester interchange reaction in the presence of 0.055 part of magnesium acetate tetrahydrate and 0.050 part of calcium acetate monohydrate as ester interchange catalysts according to a conventional method. Then, 0.011 part of trimethyl phosphate was added to substantially terminate the ester interchange reaction. Then, 0.011 part of titanium trimellitate was added, and spherical silicone particles having an average particle diameter of 0.5 $\mu$m and spherical silica particles having an average particle diameter of 0.1 $\mu$m were added in such amounts that the concentrations thereof in the polymer were 0.07% by weight and 0.2% by weight, respectively, to give a polyethylene terephthalate resin C having an intrinsic viscosity of 0.60.

Each of the above polyethylene terephthalate resins A and C was dried at 170° C. for 3 hours, then supplied to two extruders and melted at a melting temperature of 280 to 300° C. After the resin A was subjected to the high-precision filtration with a steel wire filter having average mesh openings of 10 $\mu$m and the resin C was subjected to the high-precision filtration with a steel wire filter having average mesh openings of 30 $\mu$m, a resin layer (C) was laminated on one surface of a resin layer (A) through a multi-manifold co-extrusion die, and the laminated film was quenched to give an 89 $\mu$m thick unstretched laminate film.

The obtained unstretched film was preheated, and further, stretched by 3.3 times between low-speed and high-speed rolls at a film temperature of 100° C., and the stretched film was quenched. Then, an aqueous coating solution (total solid content of 1.0% by weight) containing 65 parts of an acryl-modified polyester "IN-170-6" (softening point: 57° C.) supplied by Takamatsu Yushi K.K., 29 parts of "Nonion NS-240" (softening point: 46° C.) supplied by NOF Corporation, 1 part of "Nonion NS-208.5" (softening point: 10° C. or lower) supplied by NOF Corporation and 5 parts of an acrylic filler having an average particle diameter of 30 nm was applied onto the layer (A) surface side of the longitudinally stretched film by a kiss-roll coating method. Thereafter, the film was supplied to a stenter and stretched by 4.2 times in a transverse direction at 110° C. The obtained biaxially oriented film was heat-set with hot air at 220° C. for 4 seconds to obtain a biaxially oriented laminate polyester film having an 8 nm thick coating layer (B) and having a total film thickness of 6.4 μm. Concerning the thickness of each of the layer (A) and the layer (C), the thickness of the layer (C) was adjusted to 1.0 μm by controlling the discharge amounts of the two extruders. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Example 2

After an ester interchange reaction was completed in the same manner as in Example 1, a solution of titanium trimellitate in ethylene glycol (equivalent to 0.011 part as titanium trimellitate) which solution had been subjected to the solution filtration was added, and further, an ethylene glycol slurry of spherical silica particles having an average particle diameter of 0.06 μm, which slurry was filtrated in advance through a filter having mesh openings of 0.1 μm, was added in such an amount that its concentration in the polyester was 0.05% by weight. Thereafter, a polycondensation was carried out under high-temperature and high-vacuum conditions according to a conventional method to give a polyethylene terephthalate resin A having an intrinsic viscosity of 0.60. Thereafter, a biaxially oriented laminate polyester film was obtained in the same manner as in Example 1. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Example 3
(1) Method of Preparing Polyester

100 Parts of dimethyl terephthalate and 70 parts of ethylene glycol were subjected to an ester interchange reaction according to a conventional method in the presence of the following solutions as ester interchange catalysts, i.e., a solution of calcium acetate monohydrate in ethylene glycol (equivalent to 0.033 part as calcium acetate monohydrate) and a solution of magnesium acetate tetrahydrate in ethylene glycol (equivalent to 0.044 part as magnesium acetate tetrahydrate), each of which solution had been subjected to the solution filtration. Thereafter, a solution of trimethyl phosphate in ethylene glycol (equivalent to 0.012 part as trimethyl phosphate) which solution had been subjected to the solution filtration was added to substantially terminate the ester interchange reaction. Further, a solution of titanium tetrabutoxide in ethylene glycol (equivalent to 0.007 part as titanium tetrabutoxide) which solution had been subjected to the solution filtration was added, and then a polycondensation was carried out under high-temperature and high-vacuum conditions according to a conventional method to give a polyethylene terephthalate having an intrinsic viscosity of 0.60.

(2) Method of Preparing Phosphorus Compound Master Polyester

100 Parts of dimethyl terephthalate and 70 parts of ethylene glycol were subjected to an ester interchange reaction according to a conventional method, in which the reaction was initiated in the presence of the following solution as an ester interchange catalyst, a solution of manganese acetate tetrahydrate in ethylene glycol (equivalent to 0.051 part as manganese acetate tetrahydrate) which solution had been subjected to the solution filtration, and 20 minutes after initiation of distillation of methanol, a solution of antimony trioxide in ethylene glycol (equivalent to 0.024 part as antimony trioxide) which solution had been subjected to the solution filtration (heating treatment was carried out when dissolving the antimony trioxide in ethylene glycol)was added. Thereafter, a solution of trimethyl phosphate in ethylene glycol (equivalent to 0.135 part as trimethyl phosphate) which solution had been subjected to the solution filtration was added to substantially terminate the ester interchange reaction. Then, a solution of potassium acetate in ethylene glycol (equivalent to 0.013 part as potassium acetate) which solution had been subjected to the solution filtration was added, and thereafter, a polycondensation was carried out under high-temperature and high-vacuum conditions according to a conventional method to give polyethylene terephthalate having an intrinsic viscosity of 0.60.

Polymer pellets obtained in the above (1) and (2) were mixed in a weight ratio ((1) to (2)) of about 8 to 2, and the mixture was used as a polyethylene terephthalate resin A.

Hereafter, a biaxially oriented laminate polyester film was obtained in the same manner as in Example 1 except that the resin A was supplied to an extruder for the film formation and melted at a temperature of 280 to 300° C. and that the steel wire filter having average mesh openings of 10 μm was replaced with a steel wire filter having average mesh openings of 13 μm. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows a content of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Example 4

A biaxially oriented laminate polyester film was obtained in the same manner as in Example 3 except that the titanium tetrabutoxide in Example 3 was replaced with a solution of germanium dioxide in ethylene glycol (equivalent to 0.014 part as germanium dioxide) which solution had been subjected to the solution filtration. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Example 5

(1) Method of Preparing Polyester

100 Parts of dimethyl-2,6-naphthalate (dimethyl-2,6-naphthalenedicarboxylate) and 70 parts of ethylene glycol were subjected to an ester interchange reaction according to a conventional method in the presence of the following solutions as ester interchange catalysts, i.e., a solution of calcium acetate monohydrate in ethylene glycol (equivalent to 0.026 part as calcium acetate monohydrate) and a solution of magnesium acetate tetrahydrate in ethylene glycol (equivalent to 0.035 part as magnesium acetate tetrahydrate), each of which solutions had been subjected to the solution filtration. Then, a solution of trimethyl phosphate in ethylene glycol (equivalent to 0.010 part as trimethyl phosphate) which solution had been subjected to the solution filtration was added to substantially terminate the ester interchange reaction. Further, a solution of germanium dioxide in ethylene glycol (equivalent to 0.014 part as germanium dioxide) which solution had been subjected to the solution filtration was added, and thereafter, a polycondensation was carried out under high-temperature and high-vacuum conditions according to a conventional method to give a polyethylene-2,6-naphthalate having an intrinsic viscosity of 0.60.

(2) Method of Preparing Phosphorus Compound Master Polyester

100 Parts of dimethyl-2,6-naphthalate and 70 parts of ethylene glycol were subjected to an ester interchange reaction according to a conventional method, in which the reaction was initiated in the presence of the following solution as an ester interchange catalyst, a solution of manganese acetate tetrahydrate in ethylene glycol (equivalent to 0.041 part as manganese acetate tetrahydrate) which solution had been subjected to solution filtration, and 20 minutes after initiation of distillation of methanol, a solution of antimony trioxide in ethylene glycol (equivalent to 0.019 part as antimony trioxide) which solution had been subjected to the solution filtration (heat treatment was carried out when dissolving the antimony trioxide in ethylene glycol) was added. Thereafter, a solution of trimethyl phosphate in ethylene glycol (equivalent to 0.108 part as trimethyl phosphate) which had been subjected to the solution filtration was added to substantially terminate the ester interchange reaction. Then, a solution of potassium acetate in ethylene glycol (equivalent to 0.010 part as potassium acetate) which solution had been subjected to the solution filtration was added, and then, a polycondensation was carried out under high-temperature and high-vacuum conditions according to a conventional method to give a polyethylene-2,6-naphthalate having an intrinsic viscosity of 0.60.

Polymer pellets obtained in the above (1) and (2) were mixed in a weight ratio ((1) to (2)) of about 8 to 2, and the mixture was used as a polyethylene-2,6-naphthalate resin A.

Further, 100 parts of dimethyl-2,6-naphthalate and 70 parts of ethylene glycol were subjected to an ester interchange reaction in the presence of 0.055 part of magnesium acetate tetrahydrate and 0.050 part of calcium acetate monohydrate as ester interchange catalysts according to a conventional method. Thereafter, 0.011 part of trimethyl phosphate was added to substantially terminate the ester interchange reaction. Then, 0.011 part of titanium trimellitate was added, and spherical silicone particles having an average particle diameter of 0.5 µm and spherical silica particles having an average particle diameter of 0.1 µm were added in such amounts that the concentrations thereof in the polymer were 0.07% by weight and 0.2% by weight, respectively, to obtain a polyethylene-2,6-naphthalate resin C having an intrinsic viscosity of 0.60.

Each of the polyethylene-2,6-naphthalate resins A and C was dried at 170° C. for 6 hours, then supplied to two extruders and melted at a melting temperature of 300 to 310° C. The resin A was subjected to high-precision filtration with a steel wire filter having average mesh openings of 13 µm, and the resin C was subjected to high-precision filtration with a steel wire filter having average mesh openings of 30 µm. The resin layer (C) was laminated on one surface of the resin layer (A) through a multi-manifold co-extrusion die, and the laminated film was quenched to give a 117 µm thick unstretched laminate film.

The obtained unstretched film was preheated, and further, stretched by 3.8 times between low-speed and high-speed rolls at a film temperature of 130° C., and the stretched film was quenched. Then, an aqueous coating solution (total solid content of 1.0% by weight) containing 65 parts of an acryl-modified polyester "IN-170-6" (softening point: 57° C.) supplied by Takamatsu Yushi K.K., 29 parts of "Nonion NS-240" (softening point: 460C) supplied by NOF Corporation, 1 part of "Nonion NS-208.5" (softening point: 10° C. or lower) supplied by NOF Corporation and 5 parts of an acrylic filler having an average particle diameter of 30 nm was applied onto the surface on the layer (A) side of the longitudinally stretched film by a kiss-roll coating method. Thereafter, the film was supplied to a stenter and stretched by 4.8 times in a transverse direction at 150° C. The obtained biaxially oriented film was heat-set with hot air at 200° C. for 4 seconds to obtain a biaxially oriented laminate polyester film having the 8 nm thick coating layer (B) and having a total film thickness of 6.4 µm. Concerning the thickness of each the layer (A) and the layer (C), the thickness of the layer (C) was adjusted to 1.0 µm by controlling the discharge amounts of the two extruders. The film had a Young's modulus of 5,000 N/mm² in a longitudinal direction and a Young's modulus of 9,000 N/mm² in a transverse direction.

Table 1 shows contents of soluble metal components in the polyethylene-2,6-naphthalate resin A, the durability of the biaxially oriented laminate film against deterioration under dry heat, surface characteristics of the biaxially oriented laminate film and characteristic properties of a thin ferromagnetic film deposited tape using the film.

Example 6

A polyethylene terephthalate resin A was prepared in the same manner as in Example 1. This resin A was dried at 170° C. for 3 hours, then supplied to a extruder, melted at a melting temperature of 280 to 300° C., subjected to a high-precision filtration with a steel wire filter having average mesh openings of 10 µm, and then quenched through a slit die to obtain a 89 µm thick unstretched film.

The obtained unstretched film was preheated, and further, stretched by 3.3 times between low-speed and high-speed rolls at a film temperature of 100° C., and the stretched film was quenched. Then, an aqueous coating solution (total solid content of 1.0% by weight) containing 65 parts of an acryl-modified polyester "IN-170-6" (softening point: 57° C.) supplied by Takamatsu Yushi K.K., 29 parts of "Nonion NS-240" (softening point: 46° C.) supplied by NOF Corporation, 1 part of "Nonion NS-208.5" (softening point: 10° C. or lower) supplied by NOF Corporation and 5 parts of an acrylic filler having an average particle diameter of 30 nm was applied onto one surface of the longitudinally stretched film to form a coating layer (B) by a kiss-roll coating method. And, an aqueous coating solution (total solid content of 1.7% by weight) containing 63 parts of an acryl-modified polyester "IN-170-6" (softening point: 57° C.) supplied by Takamatsu Yushi K.K., 26 parts of "Nonion NS-240" (softening point: 46° C.) supplied by NOF Corporation, 1 part of "Nonion NS-208.5" (softening point: 10° C. or lower) supplied by NOF Corporation and 10 parts of an acrylic filler having an average particle diameter of 60 nm was applied onto the other surface of the film to form a thin film layer (C) by a kiss-roll coating method. Thereafter, the film was supplied to a stenter and stretched by 4.2 times in a transverse direction at 110° C. The obtained biaxially oriented film was heat-set with hot air at 220° C. for 4 seconds to obtain a biaxially oriented laminate polyester film having the 8 nm thick coating layer (B) and the 15 nm thick thin film layer (C) (formed by coating) and having a total film thickness of 6.4 μm. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Comparative Example 1

A biaxially oriented film was obtained in the same manner as in Example 1 except that the amounts of magnesium acetate tetrahydrate and calcium acetate monohydrate used as ester interchange reaction catalysts for the preparation of the polyethylene terephthalate resin A were changed to 0.065 part and 0.060 part, respectively. The film had a Young's modulus of 500 kg/mm$^2$ (4,900 N/mm$^2$) in a longitudinal direction and a Young's modulus of 700 kg/mm$^2$ (6,860.N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Comparative Example 2

A biaxially oriented laminate polyester film was obtained in the same manner as in Example 1 except that the steel wire filter having an average mesh openings of 10 μm for the melting and extruding of the polyethylene terephthalate resin A was replaced with a steel wire filter having an average mesh openings of 20 μm. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Comparative Example 3

A polyethylene terephthalate resin A was obtained in the same manner as in Example 2 except that an ethylene glycol slurry of spherical silica particles having an average particle diameter of 0.26 μm, which slurry was filtrated in advance through a filter having mesh openings of 0.5 μm, was added in such an amount that its concentration in the polymer was 0.1% by weight. Then, a biaxially oriented laminate polyester film was obtained in the same manner as in Example 2. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

Comparative Example 4

A biaxially oriented film was obtained in the same manner as in Example 1 except that the amount of titanium trimellitate used as the polycondensation catalyst for the preparation of the polyethylene terephthalate resin A was changed to 0.026 part. The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat and surface characteristics of the biaxially oriented laminate film. Since the film deteriorated to a great extent when evaluated for durability against deterioration under dry heat, the evaluation of the film as a thin ferromagnetic film deposited tape was cancelled.

Comparative Example 5

A biaxially oriented film was obtained in the same manner as in Example 1 except that the titanium trimellitate used as the polycondensation catalyst for the preparation of the polyethylene terephthalate resin A was changed to a solution of antimony trioxide in ethylene glycol (equivalent to 0.012 part as antimony trioxide). The film had a Young's modulus of 500 kg/mm$^2$ (4,900 N/mm$^2$) in a longitudinal direction and a Young's modulus of 700 kg/mm$^2$ (6,860 N/mm$^2$) in a transverse direction.

Table 1 shows contents of soluble metal components in the polyethylene terephthalate resin A, the durability of the biaxially oriented laminate film against deterioration under dry heat, surface characteristics of the biaxially oriented laminate film and characteristic properties of a thin ferromagnetic film deposited tape using the film.

TABLE 1

| | Item | | Ex. 1 | Ex. 2 | Ex. 3 | Ex. 4 | Ex. 5 | Ex. 6 |
|---|---|---|---|---|---|---|---|---|
| Base A | Added fine particles | | No | Spherical silica | No | No | No | No |
| | Average particle diameter | ($\mu$m) | — | 0.06 | — | — | — | — |
| | Content | (wt %) | — | 0.05 | — | — | — | — |
| | Polyester | | PET | PET | PET | PET | PEN | PET |
| | Contents of metal elements in polyester | (ppm) | Ca = 8<br>Mg = 51<br>P = 24<br>Ti = 7 | Ca = 8<br>Mg = 51<br>P = 24<br>Ti = 7 | Ca = 60<br>Mg = 40<br>P = 80<br>Ti = 7<br>Mn = 23<br>K = 10<br>Sb = 40 | Ca = 60<br>Mg = 40<br>P = 80<br>Ge = 75<br>Mn = 23<br>K = 10<br>Sb = 40 | Ca = 48<br>Mg = 31<br>P = 63<br>Ge = 75<br>Mn = 18<br>K = 8<br>Sb = 32 | Ca = 8<br>Mg = 51<br>P = 24<br>Ti = 7 |

| | Item | | C. Ex. 1 | C. Ex. 2 | C. Ex. 3 | C. Ex. 4 | C. Ex. 5 |
|---|---|---|---|---|---|---|---|
| Base A | Added fine particles | | No | No | Spherical silica | No | No |
| | Average particle diameter | ($\mu$m) | — | — | 0.26 | — | — |
| | Content | (wt %) | — | — | 0.1 | — | — |
| | Polyester | | PET | PET | PET | PET | PET |
| | Contents of metal elements in polyester | (ppm) | Ca = 136<br>Mg = 74<br>P = 24<br>Ti = 7 | Ca = 8<br>Mg = 51<br>P = 24<br>Ti = 7 | Ca = 8<br>Mg = 51<br>P = 24<br>Ti = 7 | Ca = 8<br>Mg = 51<br>P = 24<br>Ti = 20 | Ca = 8<br>Mg = 51<br>P = 24<br>Sb = 100 |

| | Item | | Ex. 1 | Ex. 2 | Ex. 3 | Ex. 4 | Ex. 5 | Ex. 6 |
|---|---|---|---|---|---|---|---|---|
| coating layer B | number of protrusions at SEM × 5,000 | (per mm$^2$) | 0 | 26000 | 0 | 0 | 0 | 0 |
| | number of protrusions at SEM × 35,000 | (per $\mu$m$^2$) | 9~11 | 9~11 | 9~11 | 9~11 | 9~11 | 9~11 |
| | extra-large protrusion (diameter of 10 $\mu$m<) | (per cm$^2$) | 2 | 3 | 4 | 5 | 4 | 2 |
| | extra-large protrusion (height of 100 nm<) | (per cm$^2$) | 2 | 3 | 3 | 4 | 2 | 2 |
| | average roughness: SRa | (nm) | 1 | 2 | 1 | 2 | 1 | 1 |
| thin film layer C | preparation method | | co-extrusion | co-extrusion | co-extrusion | co-extrusion | co-extrusion | coating |
| | thickness | ($\mu$m) | 1.0 | 1.0 | 1.0 | 1.0 | 1.0 | 0.025 |
| | air leak index | (KPa/Hr) | 0.5 | 0.5 | 0.5 | 0.5 | 0.5 | 0.1 |
| others | total thickness of film | ($\mu$m) | 6.4 | 6.4 | 6.4 | 6.4 | 6.4 | 6.4 |
| | Mesh opening of filter during preparation of film | ($\mu$m) | 10 | 10 | 13 | 13 | 13 | 10 |
| evaluation | C/N | | ◉ | ○ | ◉ | ◉ | ◉ | ◉ |
| | D/O | | ○ | ○ | ○ | ○ | ○ | ○ |
| | Running durability | | ○ | ◉ | ○ | ○ | ○ | ○ |
| | Durability against deterioration under dry heat | | ◉ | ◉ | ◉ | ◉ | ◉ | ◉ |

| | Item | | C. Ex. 1 | C. Ex. 2 | C. Ex. 3 | C. Ex. 4 | C. Ex. 5 |
|---|---|---|---|---|---|---|---|
| coating layer B | number of protrusions at SEM × 5,000 | (per mm$^2$) | 0 | 0 | 700 | 0 | 0 |
| | number of protrusions at SEM × 35,000 | (per $\mu$m$^2$) | 9~11 | 9~11 | 9~11 | 9~11 | 9~11 |
| | extra-large protrusion (diameter of 10 $\mu$m<) | (per cm$^2$) | 25 | 24 | 5 | 2 | 22 |
| | extra-large protrusion (height of 100 nm<) | (per cm$^2$) | 15 | 20 | 5 | 2 | 5 |
| | average roughness: SRa | (nm) | 1 | 1 | 6 | 1 | 2 |
| thin film layer C | preparation method | | co-extrusion | co-extrusion | co-extrusion | co-extrusion | co-extrusion |
| | thickness | ($\mu$m) | 1.0 | 1.0 | 1.0 | 1.0 | 1.0 |
| | air leak index | (KPa/Hr) | 0.5 | 0.5 | 0.5 | 0.5 | 0.5 |
| others | total thickness of film | ($\mu$m) | 6.4 | 6.4 | 6.4 | 6.4 | 6.4 |
| | Mesh opening of filter during preparation of film | ($\mu$m) | 10 | 20 | 10 | 10 | 10 |
| evaluation | C/N | | ◉ | ◉ | x | — | ◉ |
| | D/O | | x | x | ○ | — | x |

TABLE 1-continued

| | | | | | |
|---|---|---|---|---|---|
| Running durability | ○/⊙ | ○/⊙ | ⊙/⊙ | — | ○/⊙ |
| Durability against deterioration under dry heat | | | | x | |

Ex.: Example
C. Ex.: Comparative Example

As is clear in Table 1, the biaxially oriented polyester films obtained in Examples are excellent since they exhibit excellent electromagnetic conversion characteristics and have few extra-large protrusions that cause drop-out. In contrast, the films obtained in Comparative Examples fail to satisfy these characteristic properties at the same time.

What is claimed is:

1. A biaxially oriented laminate polyester film for magnetic recording medium, which is a laminate film comprising a base layer (A) formed of a polyester resin and a coating layer (B) formed on one surface of the base layer (A), characterized in that:

(1) the base layer (A) substantially contains no added fine particles or contains 0.001 to 0.1% by weight of added fine particles having an average particle diameter of 0.005 to 0.3 μm, (2) the coating layer (B) contains a binder resin, added fine particles and a surfactant, the added fine particles having an average particle diameter of 10 to 50 nm and being contained in an amount of 0.5 to 30% by weight, and the coating layer (B) having a thickness of 3 to 40 nm, (3) the coating layer (B) has a surface which satisfies the following surface characteristics (a) to (d):

(a) the surface has 80,000 pieces/mm$^2$ or less of protrusions having a major diameter of 0.05 μm or more when measured on the basis of a surface photograph taken and enlarged at a magnification of 5,000 with a scanning electron microscope, (b) the surface has 1 to 40 pieces/μm$^2$ of protrusions, measured on the basis of a surface photograph taken and enlarged at a magnification of 35,000 with a scanning electron microscope, (c) the surface has 10 pieces/cm$^2$ or less of extra-large protrusions having a major diameter of 10 μm or more, and has 5 pieces/cm$^2$ or less of the extra-large protrusions having a height of 100 nm or higher, and (d) the surface has a central plane average roughness (SRa) of 5 nm or less and (4) wherein the base layer (A) contains (a) at least one compound selected from the group consisting of an alkali metal compound, an alkaline earth metal compound and a manganese compound, (b) a phosphorus compound and (c) at least one compound selected from the group consisting of a germanium compound, a titanium compound and an antimony compound in an amount ratio satisfying the following expressions (1) to (6) simultaneously:

$$25 \leq M \leq 250 \quad (1)$$

$$0.1 \leq (M/P) \leq 6.0 \quad (2)$$

$$0 \leq Ti \leq 12.5 \quad (3)$$

$$0 \leq Ge \leq 110 \quad (4)$$

$$0 \leq Sb \leq 50 \quad (5)$$

$$0.3 < (Ti+Ge) \leq 110 \quad (6),$$

wherein M is a content (ppm) of a total of an alkali metal element, an alkaline earth metal element and a manganese element from the compound (a), P is a content (ppm) of a phosphorus element, Ti is a content (ppm) of a titanium element, Ge is a content (ppm) of a germanium element and Sb is a content (ppm) of an antimony element, in the polyester.

2. The biaxially oriented laminate polyester film of claim 1, wherein the surface of the coating layer (B) has 60,000 pieces/mm$^2$ or less of the protrusions having a major diameter of 0.05 μm or more when measured on the basis of a surface photograph enlarged at a magnification of 5,000 with a scanning electron microscope.

3. The biaxially oriented laminate polyester film of claim 1, wherein the surface of the coating layer (B) has 2 to 20 pieces/μm$^2$ of the protrusions, measured on the basis of a surface photograph enlarged at a magnification of 35,000 with a scanning electron microscope.

4. The biaxially oriented laminate polyester film of claim 1, wherein the polyester resin is a polyethylene terephthalate resin or a polyethylene naphthalate resin.

5. The biaxially oriented laminate polyester film of claim 1, wherein a thin film layer (C) is further laminated on a surface on the side of the base layer (A) which side is not in contact with the coating layer (B).

6. The biaxially oriented laminate polyester film of claim 5, wherein the thin film layer (C) is formed from a binder resin, added fine particles and a surfactant.

7. The biaxially oriented laminate polyester film of claim 5, wherein the thin film layer (C) is formed from a polyester resin and added fine particles.

8. The biaxially oriented laminate polyester film of claim 5, wherein the thin film layer (C) is laminated on the base layer (A) by co-extrusion of the base layer (A) and the thin film layer (C).

9. The biaxially oriented laminate polyester film of claim 5, wherein the thin film layer (C) has a film thickness satisfying the following expression, and contains added fine particles having an average particle diameter and a content satisfying the following expression, $$0.001 \leq (d)^3 \times c \times t \leq 100$$

wherein d is an average particle diameter (μm) of the added fine particles in the thin film layer (C), c is a content (% by weight) of the added fine particles and t is a thickness (nm) of the thin film layer (C).

10. The biaxially oriented laminate polyester film of claim 5, wherein the thin film layer (C) has a thickness of from 5 nm or more to ½ or less of a total thickness of the laminate polyester film.

11. The biaxially oriented laminate polyester film of claim 5, which has an air leak index of 0.1 to 2 KPa/hr.

12. The biaxially oriented laminate polyester film of claim 1 or 5, which has a total thickness of 2.5 μm to 20 μm.

13. A magnetic recording medium having a magnetic recording layer formed on the surface of the coating layer (B) of the biaxially oriented laminate polyester film recited in claim 1 or 5.

14. The magnetic recording medium of claim 13, which is for use with an Hi8 for analog signal recording, a digital video cassette recorder (DVC), data 8 mm or DDSIV for digital signal recording.

15. A biaxially oriented laminate polyester film for magnetic recording medium, which is a laminate film comprising a base layer (A) formed of a polyester resin and a coating layer (B) formed on one surface of the base layer (A), characterized in that:

(1) the base layer (A) substantially contains no added fine particles or contains 0.001 to 0.1% by weight of added fine particles having an average particle diameter of 0.005 to 0.3 μm, (2) the coating layer (B) contains a binder resin, added fine particles and a surfactant, the added fine particles having an average particle diameter of 10 to 50 nm and being contained in an amount of 0.5 to 30% by weight, and the coating layer (B) having a thickness of 3 to 40 nm, (3) the coating layer (B) has a surface which satisfies the following surface characteristics (a) to (d):

(a) the surface has 80,000 pieces/mm² or less of protrusions having a major diameter of 0.05 μm or more when measured on the basis of a surface photograph taken and enlarged at a magnification of 5,000 with a scanning electron microscope, (b) the surface has 1 to 40 pieces/μm² of protrusions, measured on the basis of a surface photograph taken and enlarged at a magnification of 35,000 with a scanning electron microscope, (c) the surface has 10 pieces/cm² or less of extra-large protrusions having a major diameter of 10 μm or more, and has 5 pieces/cm² or less of the extra-large protrusions having a height of 100 nm or higher, and (d) the surface has a central plane average roughness (SRa) of 5 nm or less and (4) wherein the base layer (A) contains a magnesium compound, a calcium compound, a titanium compound and a phosphorus compound in an amount ratio satisfying the following expressions (7) to (10) simultaneously:

$$25 \leq (Mg+Ca) \leq 200 \tag{7}$$

$$0.3 \leq Mg/Ca \leq 10 \tag{8}$$

$$0.5 \leq (Mg+Ca)/P \leq 6.0 \tag{9}$$

$$0.3 \leq Ti \leq 12.5 \tag{10},$$

wherein Mg, Ca, Ti and P represent contents (ppm) of a magnesium element, a calcium element, a titanium element and a phosphorus element, respectively, in the polyester.

16. The biaxially oriented laminate polyester film of claim 15, wherein the surface of the coating layer (B) has 60,000 pieces/mm² or less of the protrusions having a major diameter of 0.05 μm or more when measured on the basis of a surface photograph enlarged at a magnification of 5,000 with a scanning electron microscope.

17. The biaxially oriented laminate polyester film of claim 15, wherein the surface of the coating layer (B) has 2 to 20 pieces/μm² of the protrusions, measured on the basis of a surface photograph enlarged at a magnification of 35,000 with a scanning electron microscope.

18. The biaxially oriented laminate polyester film of claim 15, wherein the polyester resin is a polyethylene terephthalate resin or a polyethylene naphthalate resin.

19. The biaxially oriented laminate polyester film of claim 15, wherein a thin film layer (C) is further laminated on a surface on the side of the base layer (A) which side is not in contact with the coating layer (B).

20. The biaxially oriented laminate polyester film of claim 19, wherein the thin film layer (C) is formed from a binder resin, added fine particles and a surfactant.

21. The biaxially oriented laminate polyester film of claim 19, wherein the thin film layer (C) is formed from a polyester resin and added fine particles.

22. The biaxially oriented laminate polyester film of claim 19, wherein the thin film layer (C) is laminated on the base layer (A) by co-extrusion of the base layer (A) and the thin film layer (C).

23. The biaxially oriented laminate polyester film of claim 19, wherein the thin film layer (C) has a film thickness satisfying the following expression, and contains added fine particles having an average particle diameter and a content satisfying the following expression, $$0.001 \leq (d)^3 \times c \times t \leq 100$$

wherein d is an average particle diameter (μm) of the added fine particles in the thin film layer (C), c is a content (% by weight) of the added fine particles and t is a thickness (nm) of the thin film layer (C).

24. The biaxially oriented laminate polyester film of claim 19, wherein the thin film layer (C) has a thickness of from 5 nm or more to ½ or less of a total thickness of the laminate polyester film.

25. The biaxially oriented laminate polyester film of claim 19, which has an air leak index of 0.1 to 2 KPa/hr.

26. The biaxially oriented laminate polyester film of claim 15 or 19, which has a total thickness of 2.5 μm to 20 μm.

27. A magnetic recording medium having a magnetic recording layer formed on the surface of the coating layer (B) of the biaxially oriented laminate polyester film recited in claim 15 or 19.

28. The magnetic recording medium of claim 27, which is for use with an Hi8 for analog signal recording, a digital video cassette recorder (DVC), data 8 mm or DDSIV for digital signal recording.

* * * * *

UNITED STATES PATENT AND TRADEMARK OFFICE
CERTIFICATE OF CORRECTION

PATENT NO. : 6,670,030 B1
DATED : December 30, 2003
INVENTOR(S) : Toshikazu Uchida et al.

It is certified that error appears in the above-identified patent and that said Letters Patent is hereby corrected as shown below:

<u>Title page,</u>
Item [86], PCT No., delete "PCT/JP99/09080" and insert -- PCT/JP99/06080 --.

Signed and Sealed this

Thirteenth Day of July, 2004

JON W. DUDAS
*Acting Director of the United States Patent and Trademark Office*